(12) United States Patent
Reineke et al.

(10) Patent No.: US 11,070,652 B1
(45) Date of Patent: Jul. 20, 2021

(54) SYSTEM AND METHOD FOR ENHANCING ASSET MAPS OF PHYSICAL ASSETS IN A DEPLOYMENT

(71) Applicant: EMC IP Holding Company LLC, Hopkinton, MA (US)

(72) Inventors: Nicole Reineke, Northborough, MA (US); Valerie Charry, Melrose, MA (US); James Robert King, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/727,672

(22) Filed: Dec. 26, 2019

(51) Int. Cl.
*G06F 15/16* (2006.01)
*H04L 29/06* (2006.01)
*H04L 12/24* (2006.01)
*H04L 29/08* (2006.01)

(52) U.S. Cl.
CPC .............. *H04L 67/42* (2013.01); *H04L 41/12* (2013.01); *H04L 67/1097* (2013.01); *H04L 67/16* (2013.01)

(58) Field of Classification Search
CPC ..... H04L 67/42; H04L 67/16; H04L 67/1097; H04L 41/12
USPC .................................................. 709/202–203
See application file for complete search history.

(56) References Cited

U.S. PATENT DOCUMENTS

| 10,101,819 | B2 | 10/2018 | Trattler et al. | |
|---|---|---|---|---|
| 10,217,185 | B1* | 2/2019 | Cabanero | H04L 67/42 |
| 10,929,011 | B1* | 2/2021 | Reineke | G06F 9/4806 |
| 2005/0156715 | A1 | 7/2005 | Zou et al. | |
| 2006/0129691 | A1 | 6/2006 | Coffee et al. | |
| 2008/0086391 | A1 | 4/2008 | Maynard et al. | |
| 2009/0216438 | A1 | 8/2009 | Shafer | |
| 2014/0372907 | A1 | 12/2014 | Lee et al. | |
| 2016/0103494 | A1 | 4/2016 | Zehler et al. | |
| 2016/0343093 | A1* | 11/2016 | Riland | G06Q 10/04 |
| 2017/0024378 | A1 | 1/2017 | Sharma et al. | |
| 2017/0066459 | A1 | 3/2017 | Singh | |
| 2017/0374519 | A1 | 12/2017 | Hewitt et al. | |
| 2018/0090992 | A1 | 3/2018 | Shrivastava et al. | |
| 2018/0129276 | A1 | 5/2018 | Nguyen et al. | |
| 2018/0270120 | A1 | 9/2018 | Tung et al. | |
| 2019/0108756 | A1* | 4/2019 | Gillingham | G06F 21/31 |
| 2019/0332374 | A1* | 10/2019 | Harner | G06F 8/433 |

(Continued)

OTHER PUBLICATIONS

Washington University in St. Louis; "Enabling 'Internet of photonic things' with miniature sensors"; ScienceDaily; Sep. 12, 2018. (www.sciencedaily.com/releases/2018/09/180912144403.htm).

*Primary Examiner* — Bharat Barot
(74) *Attorney, Agent, or Firm* — Chamberlain, Hrdlicka, White, Williams & Aughtry

(57) ABSTRACT

An asset mapper for managing a deployment includes storage for storing a client oriented asset map of the deployment and a map manager. The map manager obtains a client oriented location request regarding the deployment for a client; in response to obtaining the client oriented location request: obtains the client oriented asset map of the deployment; modifies the client oriented asset map using a data source that describes at least a characteristic of a portion of the deployment to obtain an enhanced client oriented asset map; and performs an action set using the enhanced client oriented asset map to service the client oriented location request.

20 Claims, 22 Drawing Sheets

(56) References Cited

U.S. PATENT DOCUMENTS

2020/0090109 A1* 3/2020 Dozortsev .............. G06F 7/026
2020/0351345 A1* 11/2020 Bansod .............. H04L 67/1097
2021/0004757 A1* 1/2021 Serhan .................... H04L 67/12

* cited by examiner

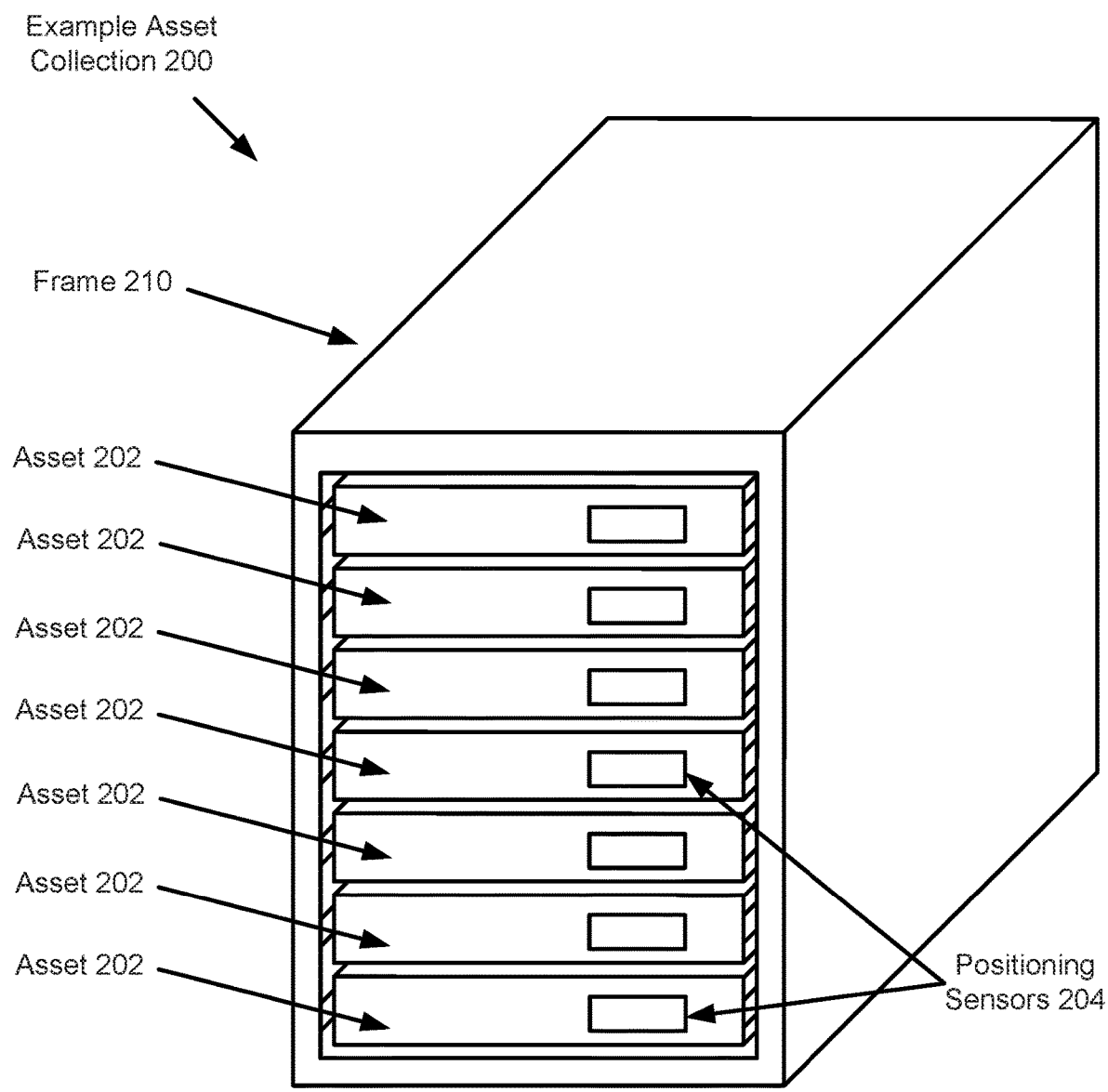
FIG. 2.1

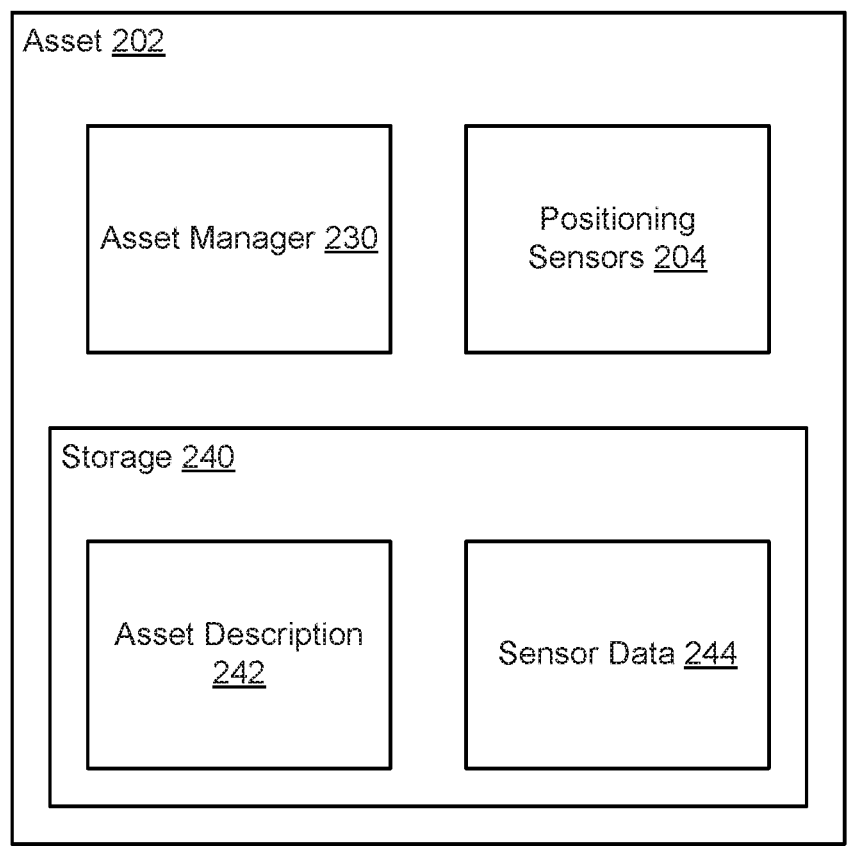
FIG. 2.2

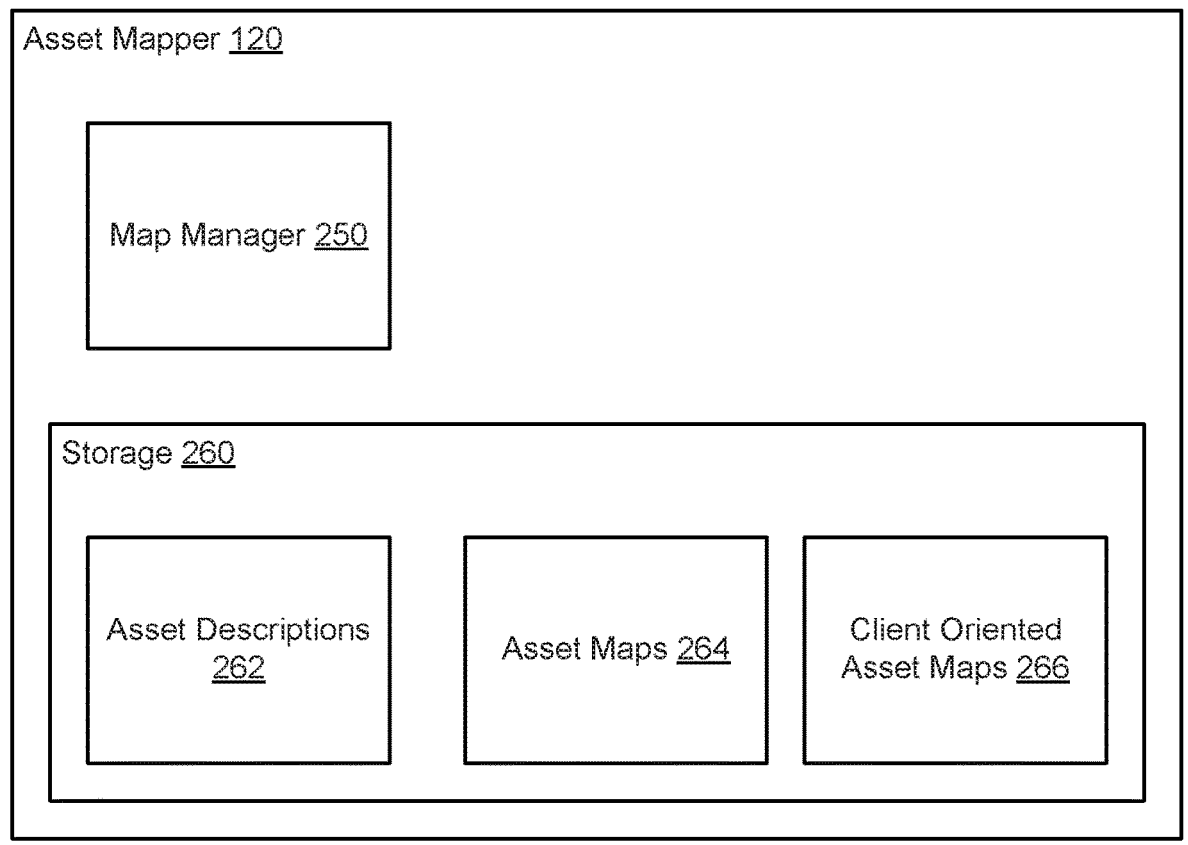
FIG. 2.3

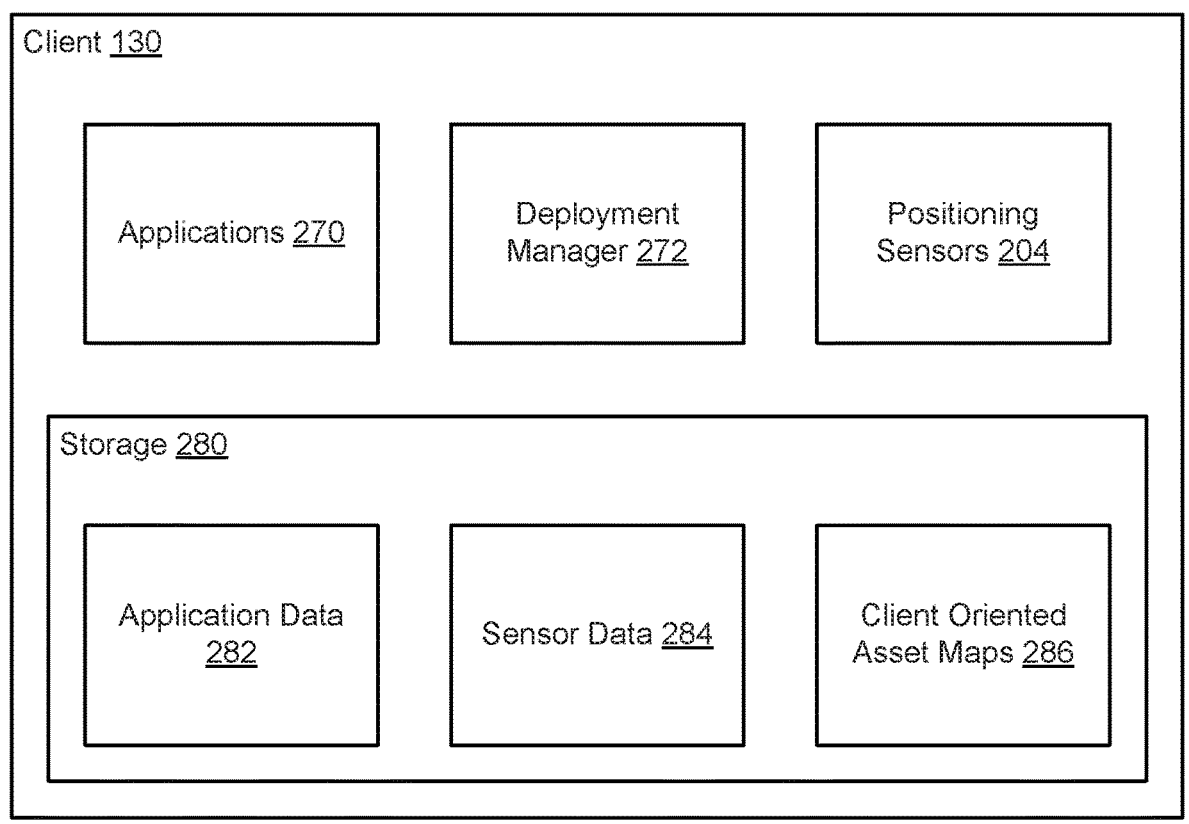
FIG. 2.4

Example Client Oriented Asset Map 290

Entry A 292

- Topology Information 294
- Asset Description 295
- Asset Collection Identifier 296

Entry N 298

FIG. 2.5

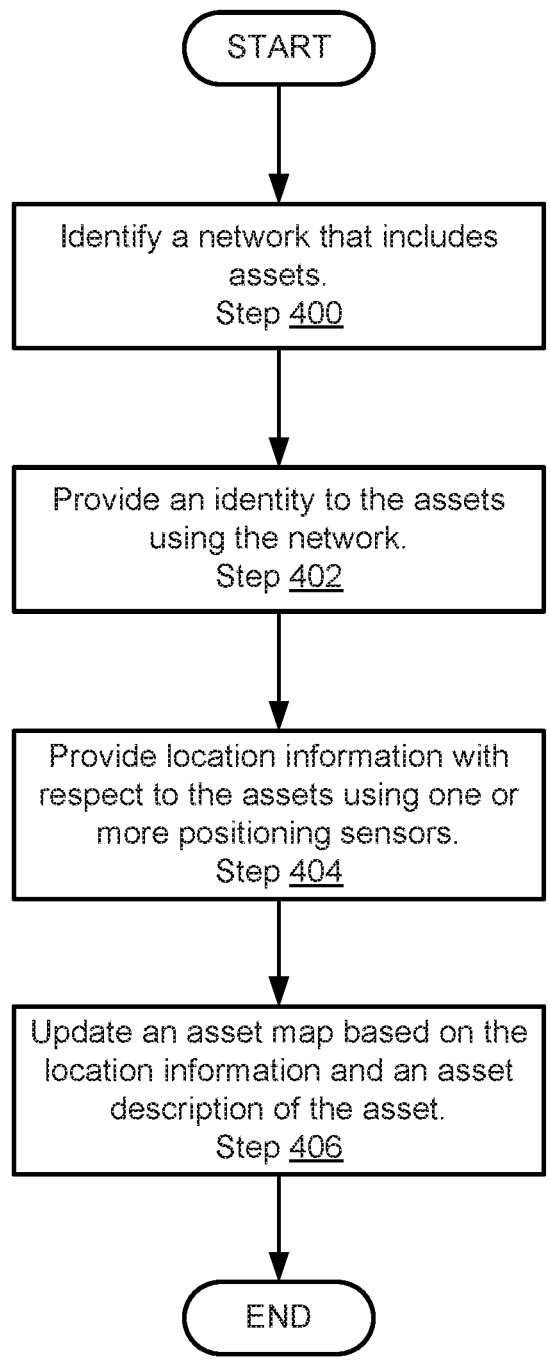
FIG. 4.1

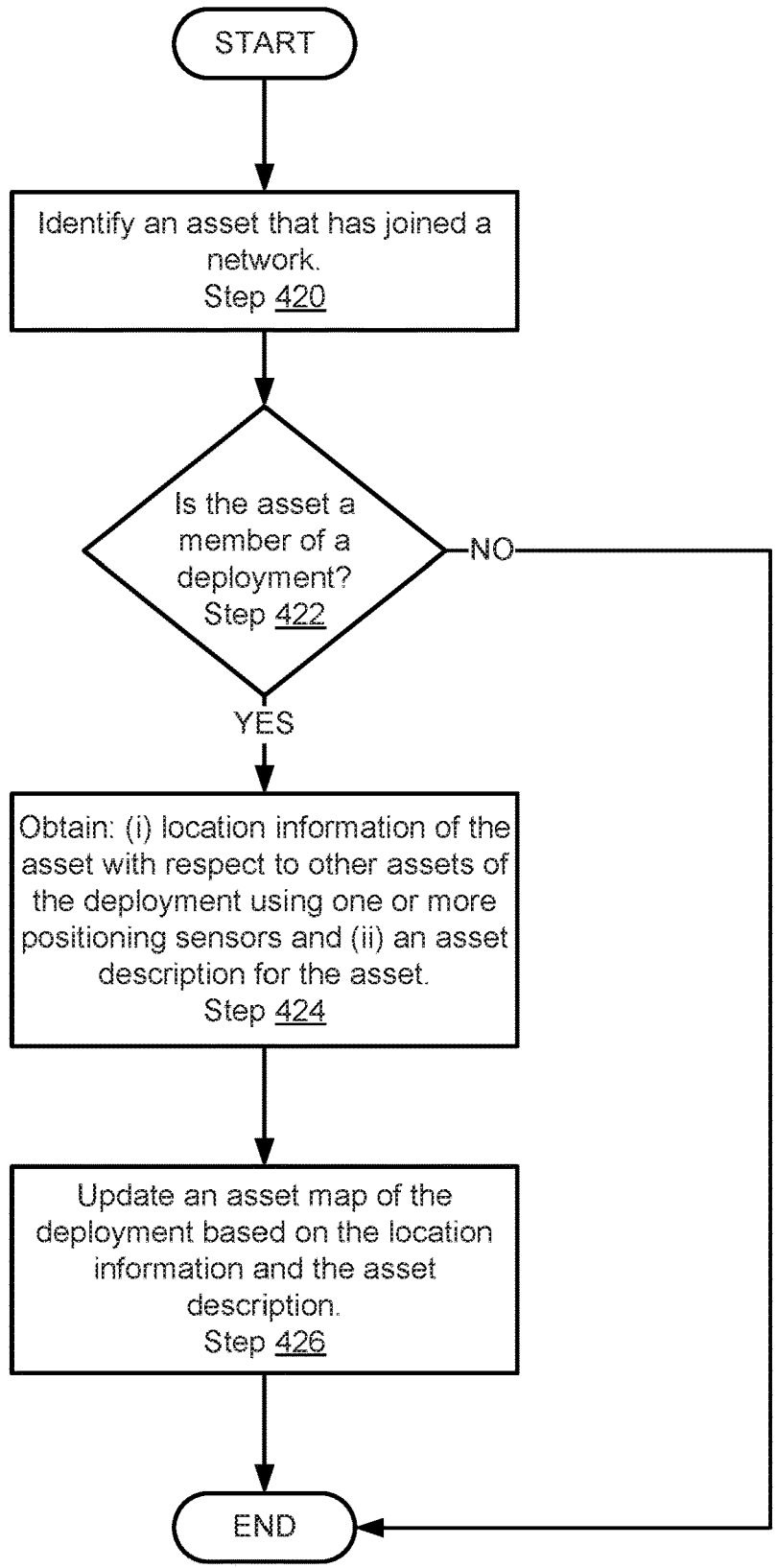
FIG. 4.2

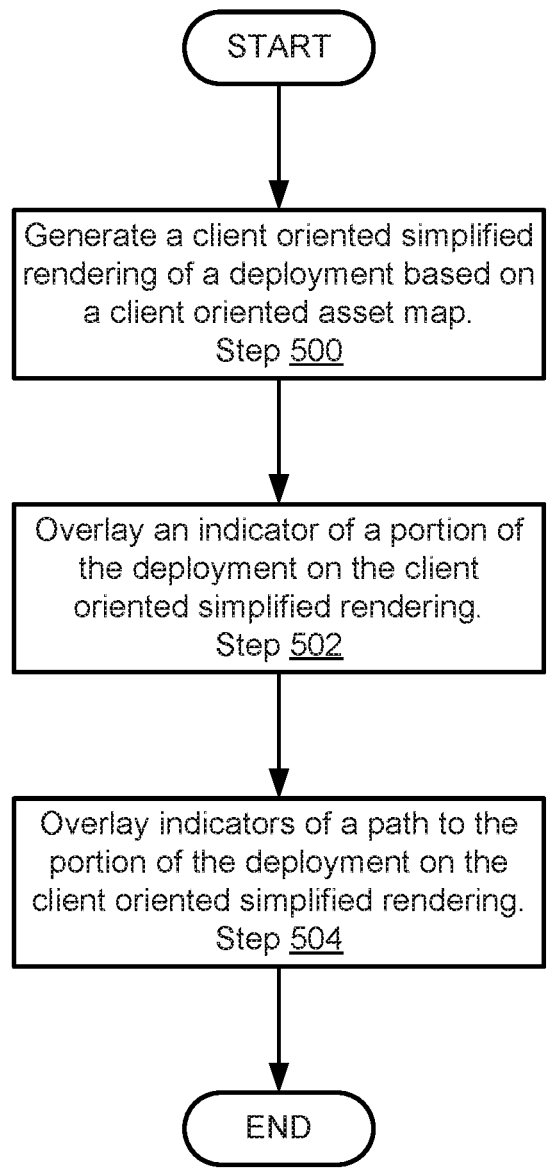
FIG. 5.1

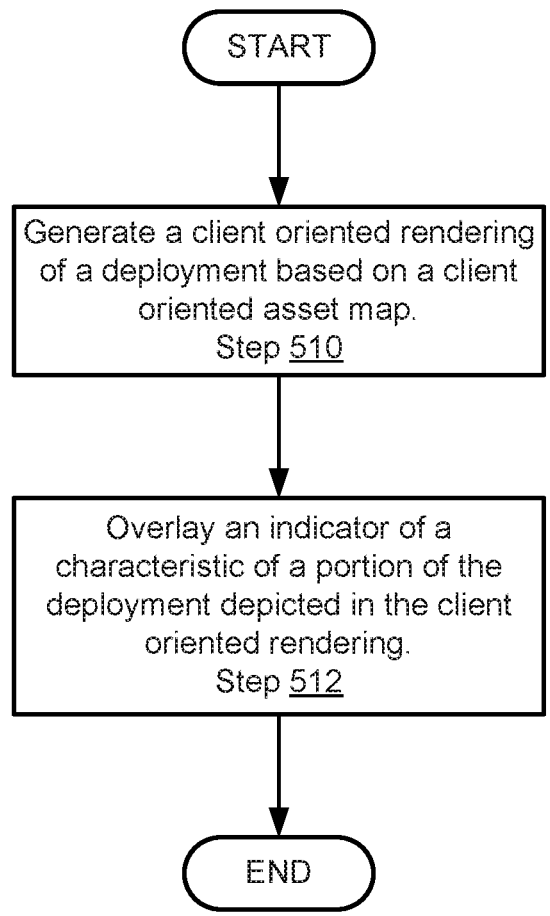
FIG. 5.2

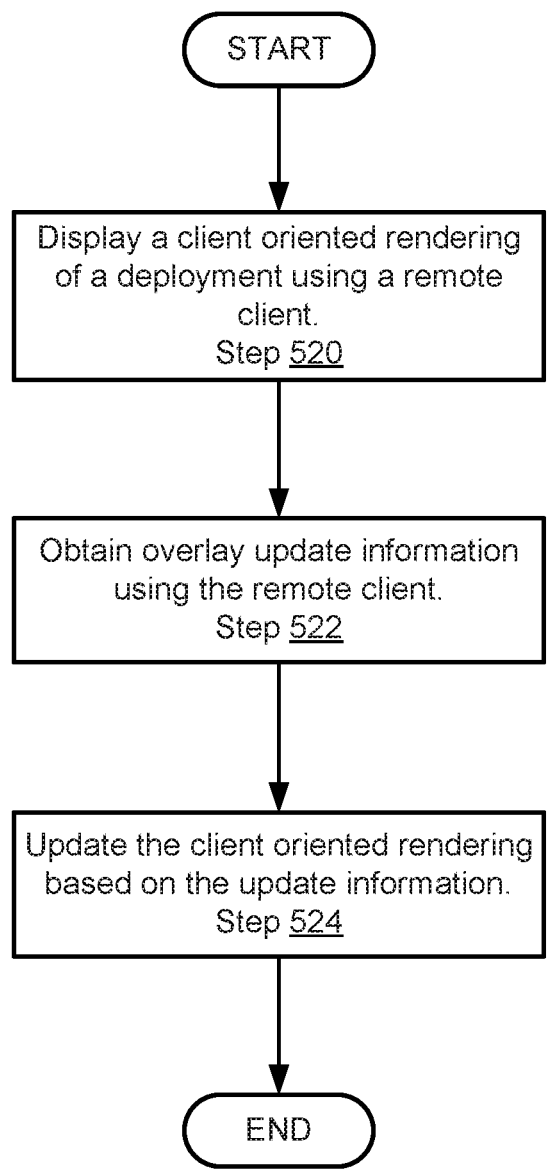
FIG. 5.3

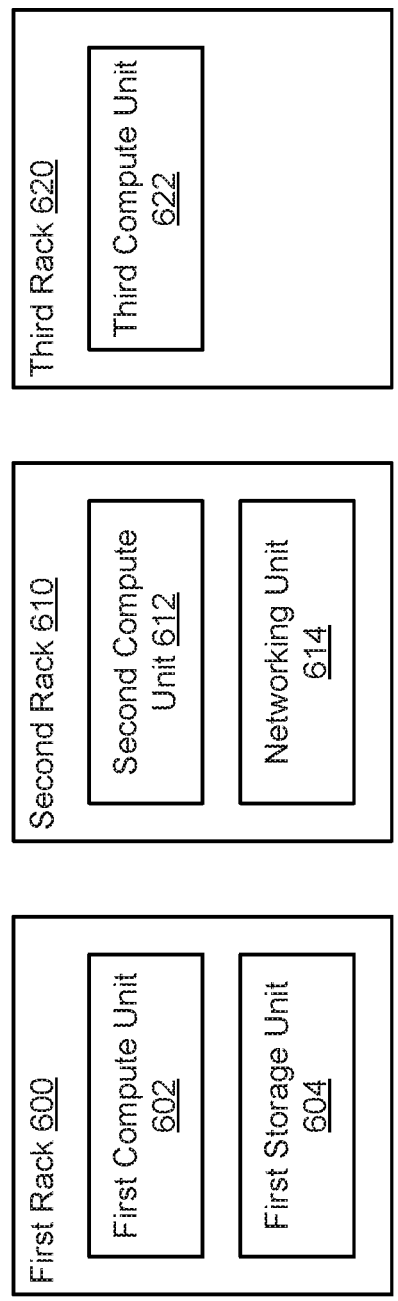
FIG. 6.1

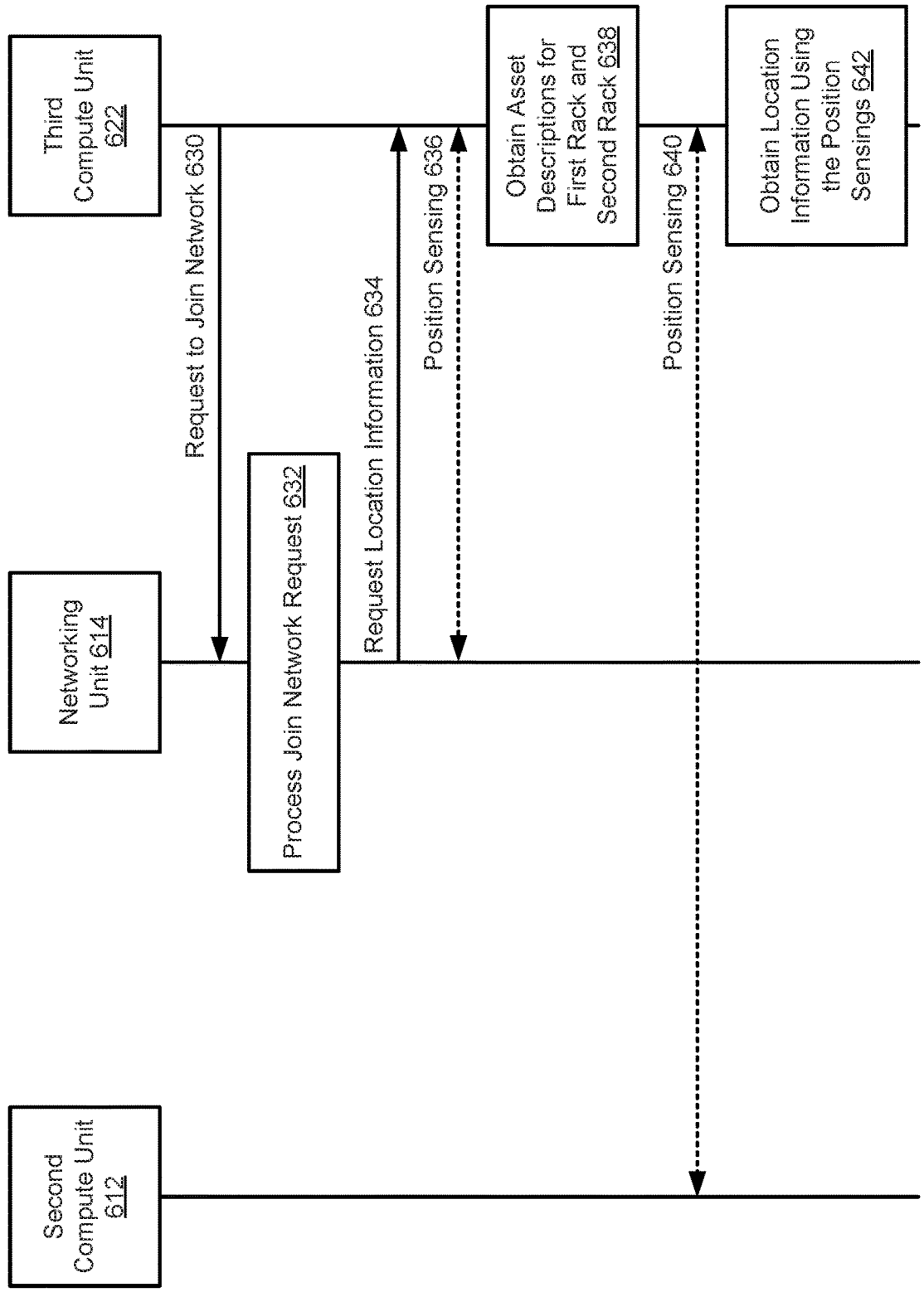
FIG. 6.2

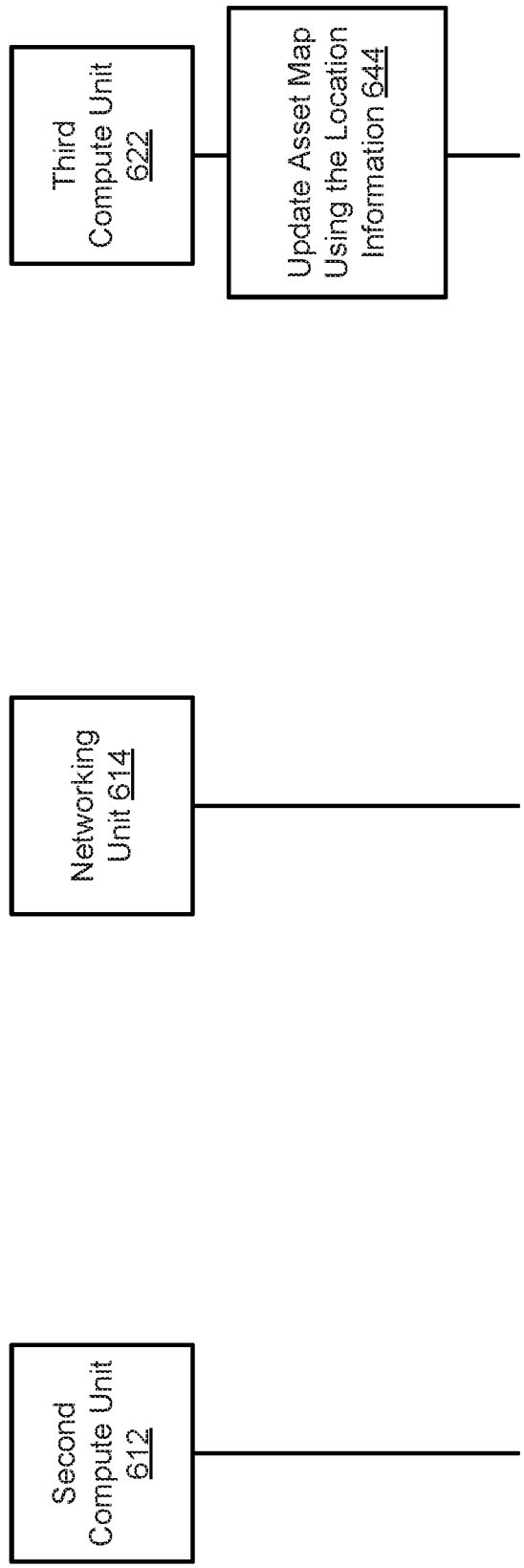
FIG. 6.3

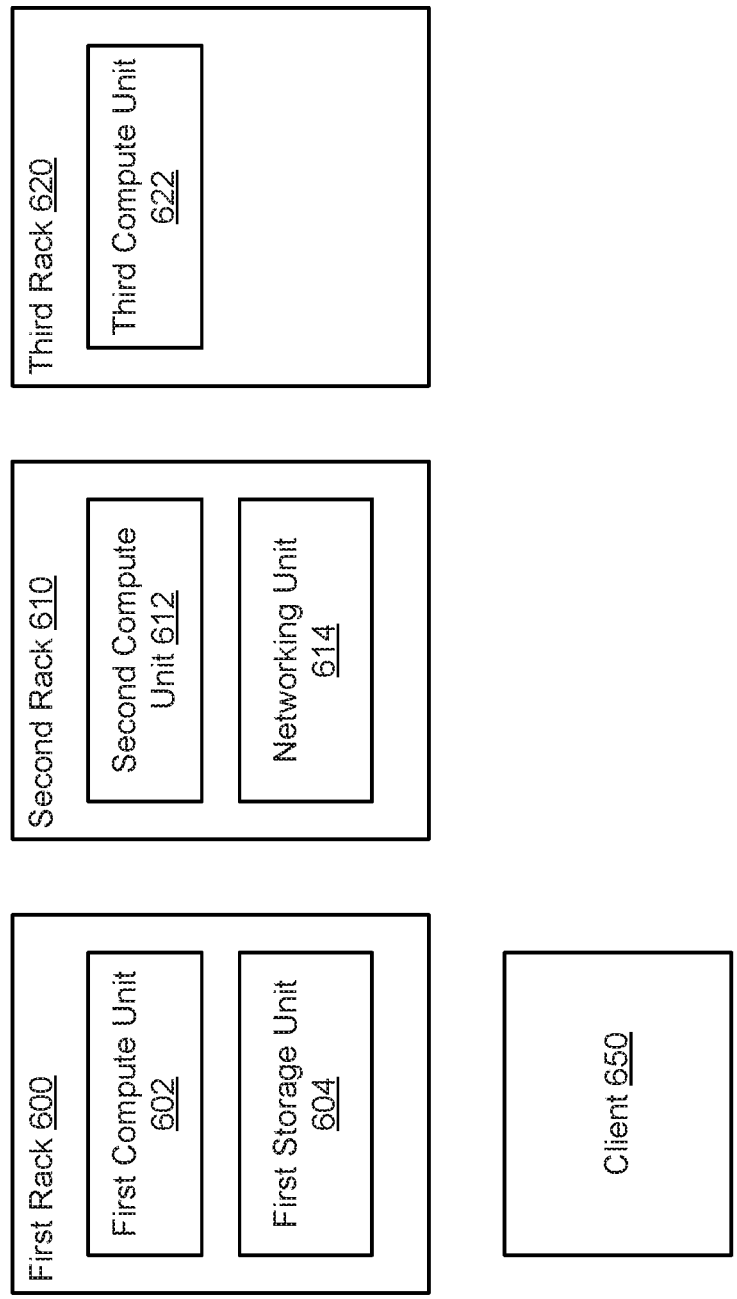
FIG. 6.4

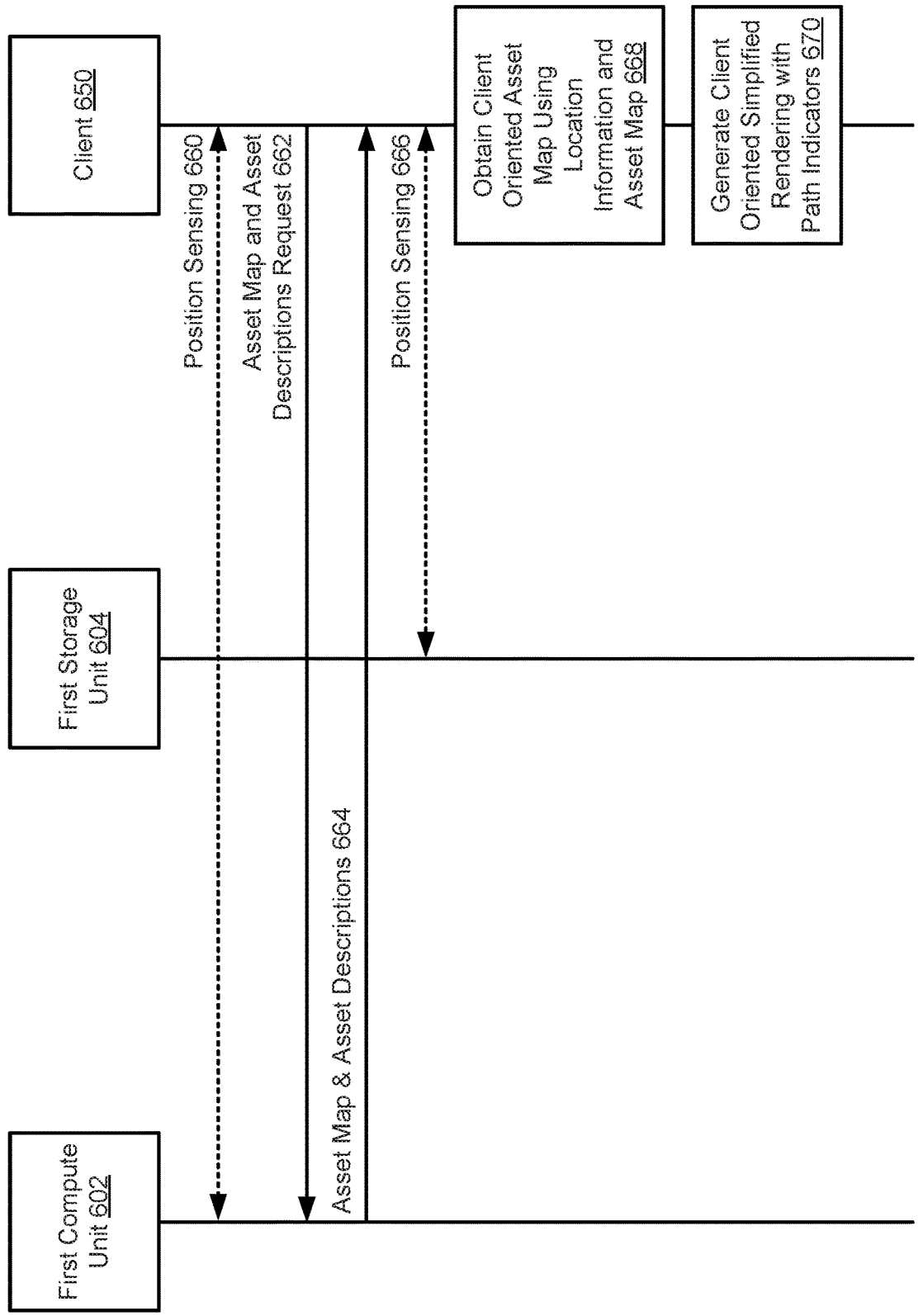
FIG. 6.5

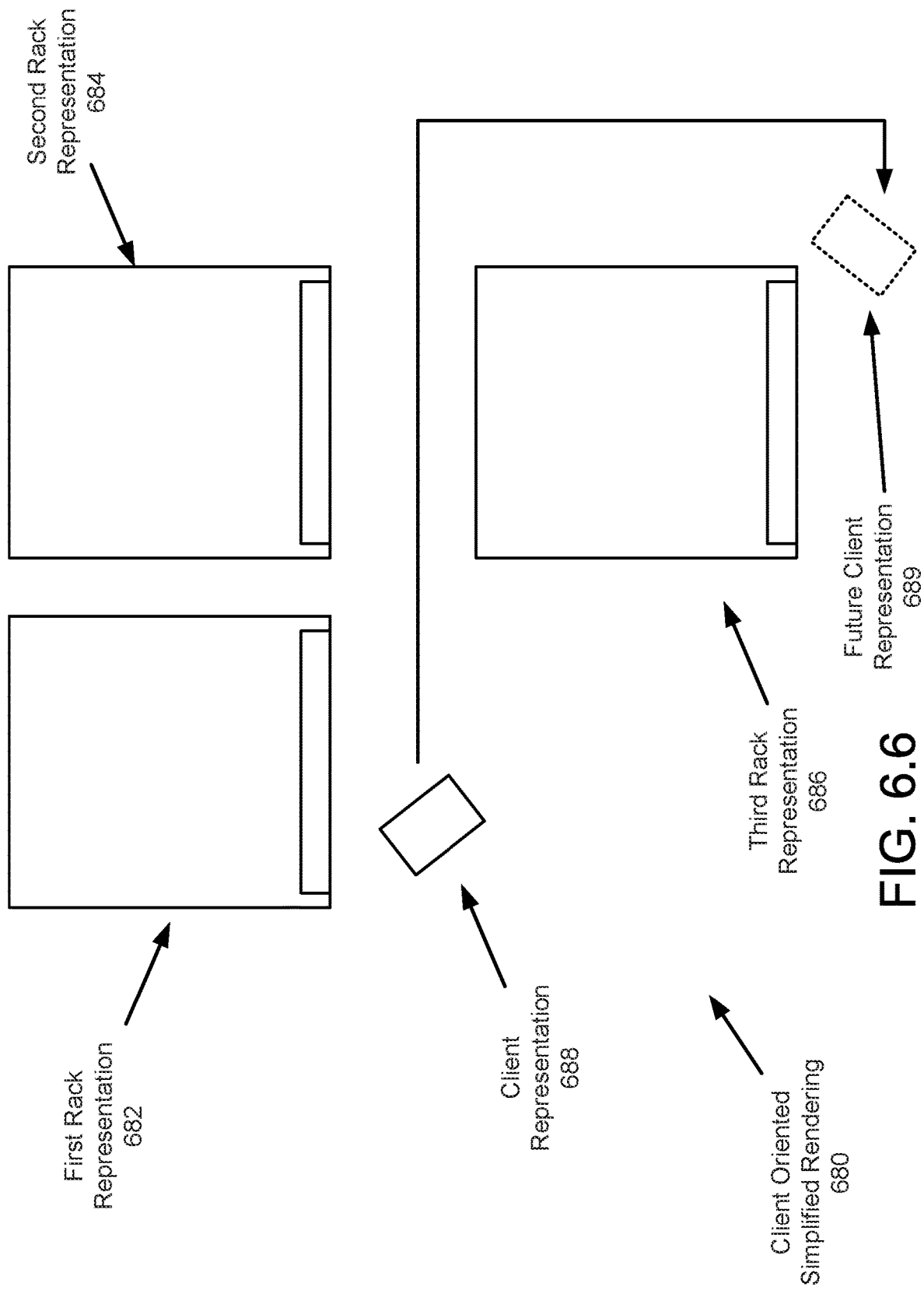
FIG. 6.6

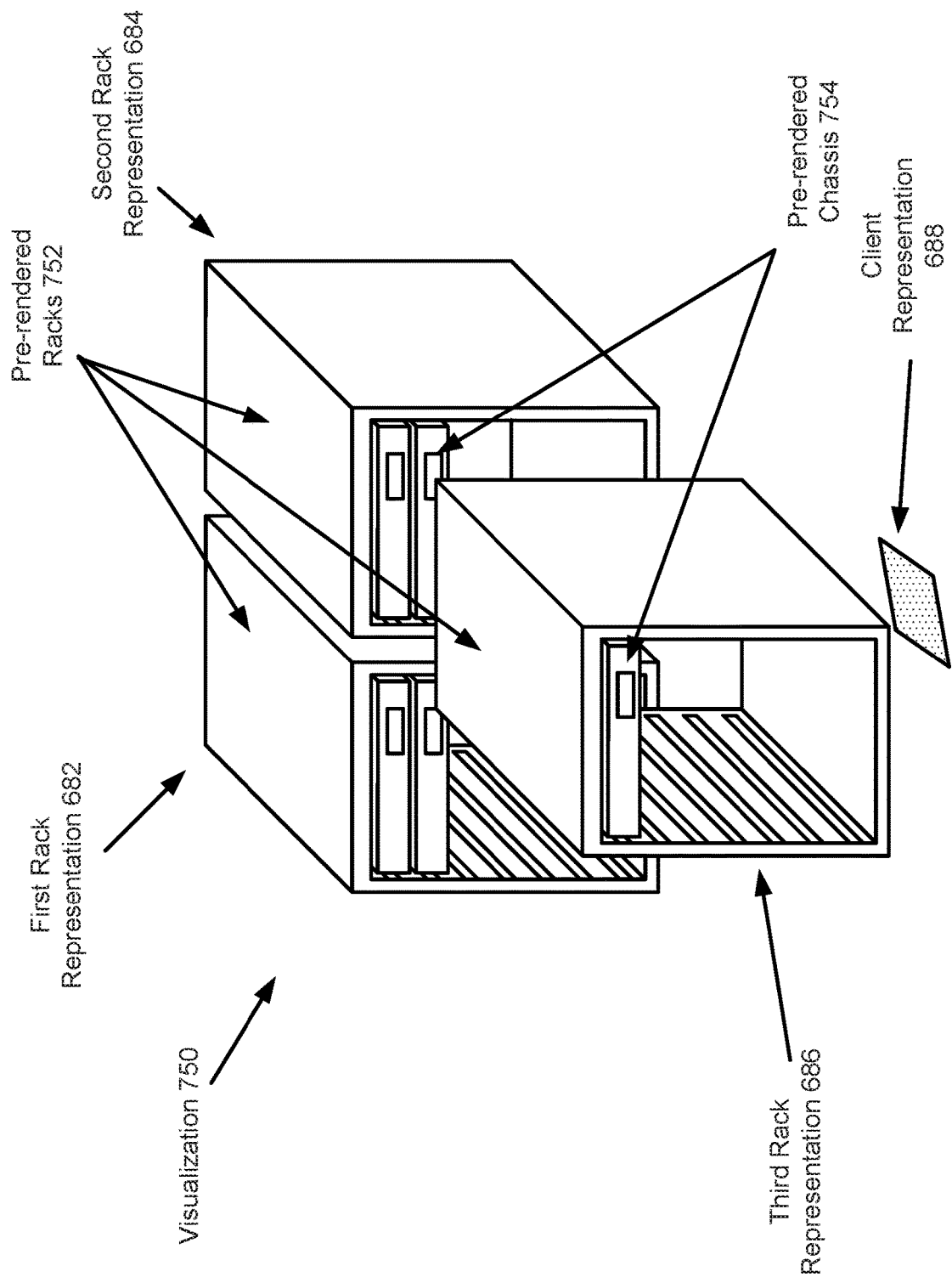
FIG. 6.7

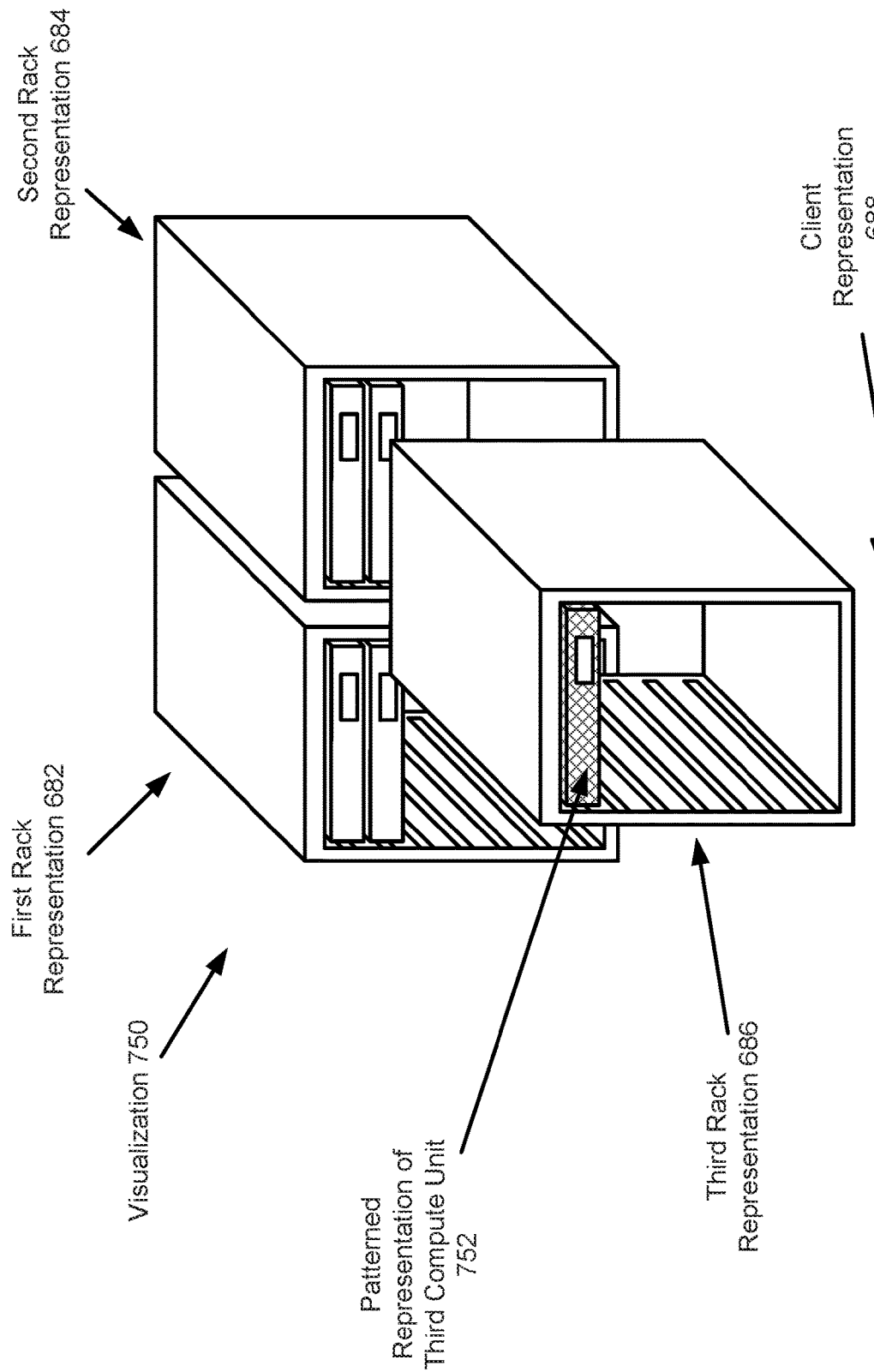
FIG. 6.8

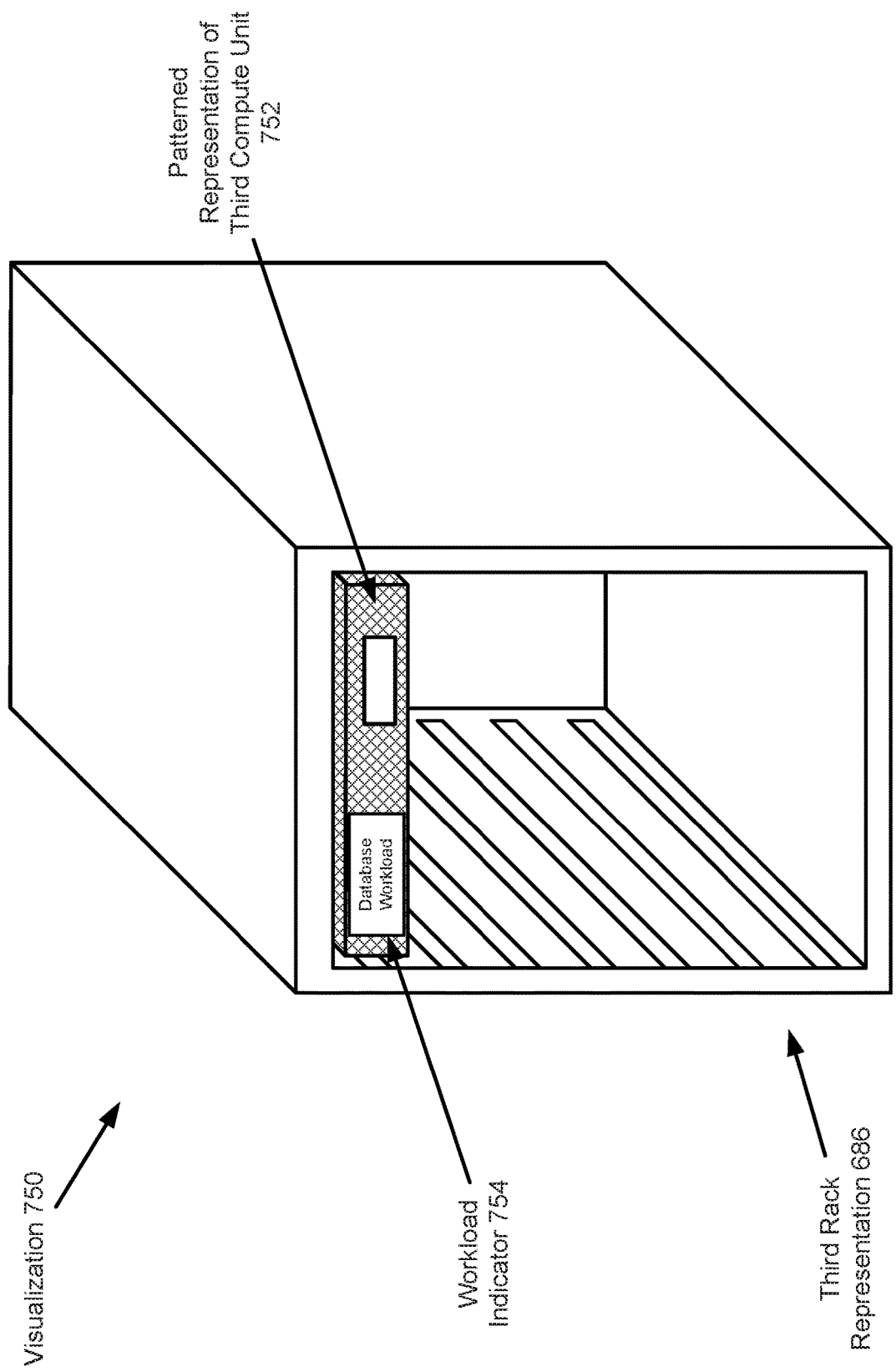
FIG. 6.9

SYSTEM AND METHOD FOR ENHANCING ASSET MAPS OF PHYSICAL ASSETS IN A DEPLOYMENT

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, an asset mapper for managing a deployment in accordance with one or more embodiments of the invention includes storage for storing a client oriented asset map of the deployment and a map manager. The map manager obtains a client oriented location request regarding the deployment for a client; in response to obtaining the client oriented location request: obtains the client oriented asset map of the deployment; modifies the client oriented asset map using a data source that describes at least a characteristic of a portion of the deployment to obtain an enhanced client oriented asset map; and performs an action set using the enhanced client oriented asset map to service the client oriented location request.

In one aspect, a method for managing a deployment in accordance with one or more embodiments of the invention includes obtaining a client oriented location request regarding the deployment for a client; in response to obtaining the client oriented location request: obtaining a client oriented asset map of the deployment; modifying the client oriented asset map using a data source that describes at least a characteristic of a portion of the deployment to obtain an enhanced client oriented asset map; and performing an action set using the enhanced client oriented asset map to service the client oriented location request.

In one aspect, non-transitory computer readable medium in accordance with one or more embodiments of the invention includes computer readable program code, which when executed by a computer processor enables the computer processor to perform a method for managing a deployment. The method includes obtaining a client oriented location request regarding the deployment for a client; in response to obtaining the client oriented location request: obtaining a client oriented asset map of the deployment; modifying the client oriented asset map using a data source that describes at least a characteristic of a portion of the deployment to obtain an enhanced client oriented asset map; and performing an action set using the enhanced client oriented asset map to service the client oriented location request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example asset collection in accordance with one or more embodiments of the invention.

FIG. 2.2 shows a diagram of an asset in accordance with one or more embodiments of the invention.

FIG. 2.3 shows a diagram of an asset mapper in accordance with one or more embodiments of the invention.

FIG. 2.4 shows a diagram of an example client oriented asset map in accordance with one or more embodiments of the invention.

FIG. 2.5 shows a diagram of a client in accordance with one or more embodiments of the invention.

FIG. 4.1 shows a flowchart of a first method of maintaining an asset map when an asset is added to a deployment in accordance with one or more embodiments of the invention.

FIG. 4.2 shows a flowchart of a second method of maintaining an asset map when an asset is added to a deployment in accordance with one or more embodiments of the invention.

FIG. 5.1 shows a flowchart of a first method of performing an action set in accordance with one or more embodiments of the invention.

FIG. 5.2 shows a flowchart of a second method of performing an action set in accordance with one or more embodiments of the invention.

FIG. 5.3 shows a flowchart of a third method of performing an action set in accordance with one or more embodiments of the invention.

FIG. 6.1 shows a diagram of an example system at a first point in time.

FIGS. 6.2-6.3 show diagrams of interactions between and actions performed by components of the example system of FIG. 6.1 over time.

FIG. 6.4 shows a diagram of the example system of FIG. 6.1 after a client is added to the example system.

FIG. 6.5 shows a diagram of interactions between and actions performed by components of the example system of FIG. 6.4 over time.

FIG. 6.6 shows a first rendering of the system of FIG. 6.4.

FIGS. 6.7-6.9 show diagrams of a visualization as features are added to the visualization.

DETAILED DESCRIPTION

Figure 1:
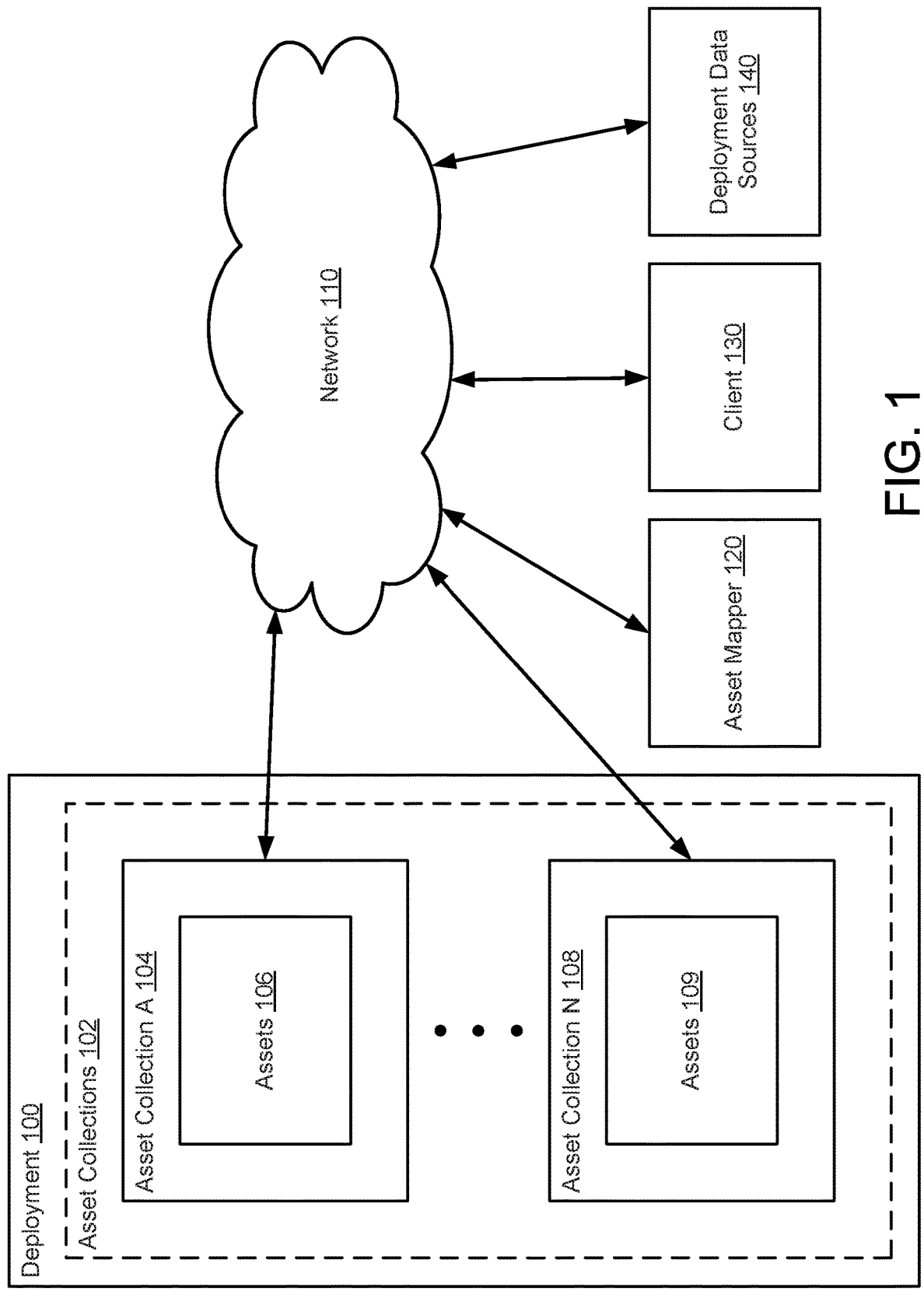
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing deployments. A deployment may include any number of assets. An asset may be a collection of hardware devices that hosts applications and/or stores data. The assets of the deployment may cooperate to provide functionalities of the deployment.

To manage a deployment, it may be necessary to identify assets of the deployment, identify applications hosted by assets of the deployment, identify workloads being performed by the assets of the deployment, and/or identify other information regarding the deployment. For example, it may be necessary to replace components of an asset of the deployment that have failed. However, due to the large number of assets of the deployment, changes in the physical or logical topology of the deployment, and limited signage or other indicators of the identities of assets of the deployment, identifying any particular asset and/or the information regarding the asset of the deployment may be challenging.

Embodiments of the invention may provide a method for dynamically generating maps of deployments that are (i) oriented with respect to an individual tasked with identifying managing the deployment and (ii) include relevant information (e.g., logical entities hosted by assets of the deployment) used to manage the deployment. To do so, the assets of the deployment and a client utilized by the individual tasked with managing the deployment may include positioning sensors that identify the relative position, orientation, and/or other telemetry information regarding the assets and the client. Such information may be used in conjunction with other information regarding the deployment (e.g., enhanced using the other information) to generate the client oriented asset maps.

The client oriented asset maps may be used, for example, to generate visualization of the deployment from the perspective of the individual tasked with managing the deployment. The visualization may be displayed to the individual via the client which may reduce the cognitive burden on the individual to identify the asset. For example, the individual may compare the displayed visualization to the view of the individual to identify the particular asset which the individual is tasked with identifying.

Additionally, overlays representing multidimensional information may be added to the visualizations to provide the individual with relevant information (in addition to spatial information regarding the deployment).

Additional embodiments of the invention provide methods and systems for facilitating remote management of a deployment. In one or more embodiments of the invention, visualizations oriented with respect to a client that is being used by a person proximate to the deployment (e.g., a local technician) are displayed on a remote client to a person that is remote to the deployment (e.g., unable to be physically present). By doing so, the remote person may be provided with the same perspective view as that of the person proximate to the client. Consequently, the cognitive burden on the remote person and person that is proximate to the deployment for working together on the deployment may be reduced.

For example, the remote person may be effectively seeing the deployment through the eyes of person proximate to the deployment via the visualization displayed on the remote client. Consequently, the remote person may provide feedback or discuss issues regarding the deployment with the proximate person via the same frame of reference. Accordingly, the complexity of terminology used to describe the deployment between the two persons may be reduced (e.g., both persons may use the same "up", "down", "left", "right" and/or other relative geometric descriptions of the deployment).

FIG. 1 shows a system in accordance with one or more embodiments of the invention. The system may include a deployment (100) that provides computer implemented services. The computer implemented services may include, for example, database services, data storage services, electronic communications services, and/or other types of services that may be implemented using computing devices.

To provide the computer implemented services, the deployment (100) may utilize computing resources provided by hardware devices. The computing resources may include, for example, processing resources, storage resources, memory resources, and/or communications resources provided by the hardware devices.

The hardware devices of the deployment may be logically and/or physically divided into assets (106, 109). An asset may include a portion of the hardware devices of the deployment (100) and an enclosure for storing the portion of the hardware devices. An enclosure may be, for example, a rack mountable chassis or another type of form factor compliant enclosure. Different assets may include different types and/or number of hardware devices. Consequently, different assets may provide different types and quantities of computing resources.

For example, an asset may include a computing device disposed in a chassis. The computing device may include a processor, memory module, storage device, communications processor, and/or other types of hardware devices. For additional details regarding computing devices, refer to FIG. 7. The aforementioned asset may provide a combination of processing resources, memory resources, storage resources, etc. However, other assets may be adapted to only provide a single type of computing resources, e.g., storage resources, memory resources, etc., by including only a limited number and/or type of hardware devices.

To enable the assets to be arranged with respect to each other, the assets of the deployment (100) may be arranged into asset collections (102). The assets may be arranged into any number of asset collections (e.g., 104, 108). Different asset collections may include different numbers and/or types of assets.

An asset collection (e.g., 104, 108) may include any number of assets arranged in a predetermined manner. For example, an asset collection may include a rack used to arrange a number of assets, having rack mountable chassis, into a predetermined arrangement (e.g., vertically stacked). The asset collections (102) may use devices other than racks to arrange the assets without departing from the invention. For additional details regarding asset collections, refer to FIGS. 2.1-2.2.

The asset collections (102) may be disposed at predetermined locations within the deployment (100). For example, the asset collections may be arranged into rows or other organizational schemes. The organization of the asset collections (102) may enable the asset collections to be cooled, provided power, etc.

Due to the number of assets (106), the number of hardware devices of each of the assets, and the arrangement of the assets as part of assets collections (102), it may be time consuming and/or difficult to identify particular assets of a deployment. For example, consider a scenario where a deployment includes 100 asset collections implemented as racks and each of the racks includes 12 assets implemented as rack mount chassis disposed in the racks of the asset collections. In such a scenario, when a hardware failure occurs, it may be difficult to identify any particular asset within the deployment due to the uniform physical appearance of the assets and asset collections which greatly complicates remedying of the hardware failure.

Similarly, it may be difficult to identify which of the assets are being used to service workloads of the deployment. A workload may be one or more tasks being performed by the deployment using corresponding portions of the assets (and/or components thereof) of the deployment.

In a still further example, it may be difficult to identify which of the assets are associated with one or more organizations using portions of the deployment. For example, the deployment may be performing workloads for multiple, separate organizations (e.g., companies). Consequently, different portions of the deployment may be associated with different organizations by virtue of the assets being utilized by the different organizations for performance of their respective workloads.

Embodiments of the invention may provide systems and methods for facilitating identification of assets of a deployment. Specifically, embodiments of the invention may provide a method for dynamically mapping the location of assets with respect to the location and/or orientation of an observer. By mapping the location of the assets with respect to the location and/or orientation of the observer, the cognitive burden placed on an observer for identifying the location of a particular asset may be greatly reduced. For example, by mapping the locations of the assets with respect to the observer, the observer may more intuitively identify the locations of the assets. In one or more embodiments of the invention, maps of the assets of a deployment are referred to as an asset map and an asset map that is oriented with respect to an observer is referred to as a client oriented asset map.

Additional embodiments of the invention may provide systems and methods for enhancing client oriented asset maps and/or asset maps. The enhancements may include, for example, mapping ownership, workloads being performed, and/or other characteristics of the assets to the aforementioned maps. By doing so, enhanced renderings of deployments maybe generated that include visualizations of physical assets, logical entities (e.g., workloads) that utilize the physical assets, and/or information regarding the physical assets (e.g., utilizers of the assets, applications hosted by the assets, interconnections between the assets and/or other devices, etc.).

By reducing the cognitive burden on users for identifying assets and/or characteristics (e.g., hosted applications, workloads, etc.) of the assets of a deployment using a client oriented asset map of the deployment, the accuracy of asset identification may be improved thereby improving the uptime and/or performance of the deployment (100). For example, by improving the accuracy of identifying an asset, the time required to resolve hardware, software, and/or other types of issues that may impact the performance of the deployment (100) may be reduced.

To provide the aforementioned functionality, a system in accordance with embodiments of the invention may include assets (106) that identify their position, orientation, and/or other telemetry information with respect to other assets. To do so, each of the assets may include positioning sensors that may be used to identify the relative position of an asset with respect to the position of another asset. For additional details regarding assets (e.g., 106, 109), refer to FIGS. 2.1-2.2.

The position, orientation, and/or other telemetry information may be used to generate and/or maintain a map of the assets (e.g., an asset map) of the deployment (100). The map of the deployment (100) may specify, for example, the relative position of each of the assets with respect to the other assets. The map of the assets may be generated and/or maintained by an asset mapper (120).

The map of the assets of the deployment (100) may also be generated using descriptions of the arrangement of the assets of the deployment. For example, when a deployment is deployed, a description of the assets included in each of the asset collections may be generated. The aforementioned description of the assets of the deployment (100) may be used to improve the quality (e.g., accuracy, precision, etc.) of asset maps and/or determinations regarding the relative position of an observer, discussed below. For example, the description of the assets may be used to determine whether determinations regarding the location, orientation, and/or other telemetry information are likely to be accurate. In other words, whether the determinations regarding the positions and/or orientations of the assets are consistent with the description of the assets.

For example, due to the arrangement of assets as part of an asset collection, a description of the assets may specify that the assets of an asset collection should be similarly positioned with respect to a particular asset (e.g., an asset facing a rack of assets). Accordingly, if the determinations regarding the locations and/or orientations of the assets indicate that the assets of the asset collections are not located in the same relative position with respect to an asset, the determinations regarding the locations and/or orientations of the assets may be determined to be inaccurate.

The map of the assets of the deployment (100) may include additional information regarding each of the assets such as, for example, applications hosted by the assets, workloads being performed by the assets, associations between the assets and organizations (e.g., organizations that may have rights in the assets such as in a multi-tenant scenario), etc. Such information may be used, in part, to provide enhanced asset maps and/or enhanced client oriented asset maps. The additional information used to enhance the maps may be obtained from any number of sources including, for example, operating systems or other management entities hosted by the assets and/or deployment data sources (140) separate from the assets.

To dynamically map the location and/or orientation of an observer with respect to the assets of the deployment (100), an observer (e.g., a person such as a technician or deployment administrator) may utilize a client (130). A client (130) may be a device (physical or virtual) operated by an observer (e.g., an administrator, a technician, etc.) that desires to identify particular assets of a deployment. The client (130)

may identify the position, orientation, and/or other telemetry information of the user of the client (130) (e.g., an observer) with respect to one or more of the assets of the deployment (100). To do so, the client (130) may include positioning sensors that may be used to identify the relative position of the client (130) with respect to one or more of the assets (106).

The client (130) may provide the aforementioned telemetry information to other entities or use the telemetry information to otherwise obtain a client oriented asset map of the deployment. Using the client oriented asset map, the client (130) may provide information to the observer that enables the observer to more easily identify assets of the deployment. For example, the client (130) may generate visualizations regarding the assets of the deployment or other types of displays or interactive visualizations which the observer may utilize to identify assets or otherwise better understand the topology of the deployment. The client (130) and/or other entities such as the asset mapper (120) may generate enhanced asset and/or client oriented asset maps using the asset maps and/or other information regarding the deployment obtained from any number of sources, as discussed above. For additional details regarding the client (130), refer to FIG. 2.4.

While illustrated as including a single client (130) in FIG. 1, a system in accordance with embodiments of the invention may include any number of clients. For example, a first client may be utilized by a person that is near the deployment (100) and a second client may be utilized by a second person that is remote to the deployment (100). By doing so, renderings of client oriented asset maps that are generated with respect the location and orientation of the first client may be displayed by the second client to enable the second person to have an oriented view of the deployment that is keyed to the view of the deployment by the person that is near the deployment (100). By being provided with a common view point, the cognitive burden on both persons for working cooperatively to resolve issues with the deployment may be reduced.

As noted above, the position, orientation, and/or other telemetry information of the client (130) with respect to the assets (106) may be used to dynamically generate and/or maintain a map of the assets of the deployment (100) with respect to the position and/or orientation of the observer. In other words, the telemetry may be used to generate a client oriented asset map. The map of the assets relative to the observer may be generated and/or maintained by the asset mapper (120). Similarly, the asset mapper (120) may maintain an asset map of the deployment using similar information (e.g., location/orientation/other telemetry information) regarding the assets of the deployment. Such maps may be enhanced to include additional information (beyond that of a description of the physical assets of the deployment) regarding the assets of the deployment. For additional details regarding the asset mapper (120), refer to FIG. 2.3. For additional details regarding client oriented asset maps, refer to FIG. 2.5.

The components of the system of FIG. 1 may be operably connected to each other and/or other entities via any combination of wired and/or wireless network. For example, the aforementioned components may each be operably connected to a network (110) that facilitates communications between these components.

The deployment (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment (100) described in this application and/or all, or a portion, of the methods illustrated in FIGS. 3-5.3. The deployment (100) may be implemented using other types of computing devices without departing from the invention. For additional details regarding computing devices, refer to FIG. 7.

The deployment (100) may be implemented using logical devices without departing from the invention. For example, the deployment (100) may be implemented using virtual machines that utilize computing resources of any number of physical computing devices (e.g., refer to FIG. 7) to provide their respective functionalities. The deployment (100) may be implemented using other types of logical devices without departing from the invention.

In one or more embodiments of the invention, the deployment (100) provides any number of computer implemented services. The computer implemented services may include, for example, file storage services, database services, electronic communication services, etc. The deployment (100) may provide other types of computer implemented services without departing from the invention. Each of the assets (e.g., 106, 109) of the deployment (100) may provide similar and/or different computer implemented services.

The asset mapper (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset mapper (120) described in this application and/or all, or a portion, of the methods illustrated in FIGS. 3-5.3. The asset mapper (120) may be implemented using other types of computing devices without departing from the invention. For additional details regarding computing devices, refer to FIG. 7.

The asset mapper (120) may be implemented using logical devices without departing from the invention. For example, the asset mapper (120) may be implemented using virtual machines that utilize computing resources of any number of physical computing devices (e.g., refer to FIG. 6) to provide their respective functionalities. The asset mapper (120) may be implemented using other types of logical devices without departing from the invention.

While illustrated as a separate entity, the functionality of the asset mapper (120) may be implemented via the client (130) and/or the assets (106, 109) of the deployment (100). For example, the asset mapper (120) may be implemented as a distributed application that executes using the computing resources of the other components of the system of FIG. 1 and/or computing resources of other entities not illustrated in FIG. 1.

In one or more embodiments of the invention, the asset mapper (120) provides mapping services. Mapping services may include generating of asset maps of deployments and/or client oriented asset maps and/or providing asset maps and/or client oriented asset maps. To generate such maps, the asset mapper (120) may obtain location information (e.g., relative position, orientation, and/or other telemetry information) regarding one or more of the assets (106, 109) and/or the client (130) with respect to each other. The aforementioned information may be utilized to generate the asset maps and/or client oriented asset maps.

The client (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (130) described in this application and/or all, or a portion, of the methods illustrated in FIGS. 3-5.3. The client (130) may be implemented using other types of computing devices without departing from the invention. For additional details regarding computing devices, refer to FIG. 7.

The client (130) may be implemented using logical devices without departing from the invention. For example, the client (130) may be implemented using virtual machines that utilize computing resources of any number of physical computing devices (e.g., refer to FIG. 6) to provide their respective functionalities. The client (130) may be implemented using other types of logical devices without departing from the invention.

In one or more embodiments of the invention, the client (130) provides deployment information to observers. The deployment information may be provided to the client (130) through visualizations of the deployment (100) or other types of graphical user interfaces that enable observers to more easily identify assets of the deployment. For example, the client (130) may generate a graphical representation of the deployment keyed to the position and/or orientation of the client (130) with respect to the deployment, highlight the different assets within the deployment, and/or illustrate other types of information regarding the deployment. For additional details regarding the client, refer to FIG. 2.4.

The deployment data sources (140) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment data sources (140) described in this application and/or all, or a portion, of the methods illustrated in FIGS. 3-5.3. The deployment data sources (140) may be implemented using other types of computing devices without departing from the invention. For additional details regarding computing devices, refer to FIG. 7.

The deployment data sources (140) may be implemented using logical devices without departing from the invention. For example, the deployment data sources (140) may be implemented using virtual machines that utilize computing resources of any number of physical computing devices (e.g., refer to FIG. 7) to provide their respective functionalities. The deployment data sources (140) may be implemented using other types of logical devices without departing from the invention. In one or more embodiments of the invention, the deployment data sources (140) provide any type and quantity of information (e.g., characteristics) regarding the deployment. For example, the deployment data sources (140) may provide information (e.g., characteristics) regarding the applications hosted be any of the assets, workloads being performed by any of the assets, associations between the assets and organizations (e.g., if more than one organization is utilizing assets of the deployment), interconnections between the assets and/or other devices (e.g., network connectivity), and/or any other types of information regarding the deployment.

The deployment data sources (140) may include functionality to respond to queries regarding characteristics of assets of the deployment. For example, the deployment data sources (140) may maintain the information regarding the deployment in a database that enables the information to be searched for relevant information. The deployment data sources (140) may provide the relevant information in response to queries regarding characteristics of the assets of the deployment.

While the system is illustrated in FIG. 1 as including a limited number of specific components, a system in accordance with embodiments of the invention may include additional, fewer, and/or different components from those illustrated in FIG. 1 and/or discussed above without departing from the invention.

As discussed above, the assets of the deployment of FIG. 1 may be arranged into asset collections. FIG. 2.1 shows a diagram of an example asset collection (200) in accordance with one or more embodiments of the invention. As discussed above, an asset collection may be a physical arrangement of assets (e.g., 202).

To arrange the assets (e.g., 202) of the example asset collection (200) with respect to each other, the example asset collection (200) may include a structural element such as, for example, a frame (210). A frame (210) may be a physical structure adapted to position and/or orient multiple assets within a predetermined space. For example, the frame (210) maybe implemented as a rack mount structure adapted to receive the chassis of the assets. When the assets are received by the frame (210), the assets (e.g., 202) may be reversibly locked in place with respect to each other.

For example, as illustrated in FIG. 2.1, the frame (210) may enable the assets (e.g., 202) to be vertically stacked with respect to the other assets (202). By doing so, the assets (e.g., 202) may be packed tightly with respect to each other and/or positioned and/or oriented in a predetermined with respect to each other. For example, as seen in FIG. 2.1, the assets may be stacked with respect to each other and orient a predetermined face of each asset.

The oriented predetermined face of each asset may include, for example, on or more positioning sensors (204). The positioning sensors (204) of the assets (e.g., 202) may enable the assets to ascertain the position, orientation, and/or other telemetry information with respect to each other.

In one or more embodiments of the invention, the positioning sensors are implemented as photonic sensors. A photonic sensor may be a device that utilizes electromagnetic radiation in an optical or near optical band to ascertain information regarding the environment in which the photonic sensor resides.

For example, a photonic sensor may include optical resonators, optical transceivers, data processors, and/or other types of hardware devices that are able to sense the position, orientation, and/or other telemetry information regarding other photonic sensors in the vicinity of the photonic sensor. By operating in an optical or near optical frequency band, the photonic sensor may obtain telemetry information without utilizing electromagnetic radiation in a frequency band used by the system of FIG. 1 for communication purposes. For example, the system of FIG. 1 may utilize one or more wireless network that operates between 1 Megahertz and 100 Gigahertz. In contrast, the photonic sensors may operate utilizing electromagnetic radiation having a frequency content above 300 Gigahertz. Consequently, the photonic sensors may be utilized to provide telemetry information without receiving interference due to communication by the system of FIG. 1. Similarly, the photonic sensors may operate without cause interference with communications by the system of FIG. 1.

The positioning sensors (204) may be implemented as different types of sensors without departing from the invention. For example, the positioning sensors (204) may be implemented using sensors that operate in the microwave frequency band such as, for example, distance and/or orientation finding sensors.

The positioning sensors (204) of each of the assets (202) may be operably coupled to computing resources of the respective assets. For additional details regarding the computing resources of the respective assets and utilization of the sensor data provided by the positioning sensors (204), refer to FIG. 2.2.

While the example asset collection (200) is illustrated as including a specific number of specific types of assets in a specific orientation, an asset collection in accordance with embodiments of the invention may include different numbers and types of assets, may orient the assets in different manners, and may include additional, fewer, and/or different components from those illustrated in FIG. 2.1 without departing from the invention.

As discussed above, an asset may include computing resources. The aforementioned resources may be used to host logical entities (e.g., programs, virtual entities). FIG. 2.2 shows a diagram of an asset (202) in accordance with one or more embodiments of the invention. The assets (106, 109) of FIG. 1 may be similar to the asset illustrated in FIG. 2.2.

As discussed above, an asset may provide computer implemented services as part of the deployment (100) and may obtain and provide positioning, orientation, and/or other types of telemetry information of the asset with respect to other assets. Additionally, the asset (202) may maintain a description of the asset. For example, the asset description (242) may specify hardware and software components of the asset (202). To provide the aforementioned functionality, the asset (202) may include an asset manager (230), positioning sensors (204), and storage (240). Each of these components of the asset (202) are discussed below.

The asset manager (230) may be implemented using physical and/or logical devices. For example, the asset manager (230) may be implemented using computer readable instructions (e.g., program code) that when executed by the computing resources of the asset (202) give rise to the functionality of the asset manager (230). In another example, the asset manager (230) may be implemented using special purpose hardware devices such as, for example, programmable gate arrays, application specific integrated circuit, or another type of hardware device that provides the functionality of the asset manager (230) by including circuitry adapted to provide the aforementioned functionality. In a still further example, the asset manager (230) may be implemented using a combination of computer readable instructions (e.g., program code) and special purpose hardware devices.

The asset manager (230) may manage the operation of the asset (202). To manage the operation of the asset (202), the asset manager (230) may obtain data from the positioning sensors (204), validate the obtained data by comparing it to other data obtained from the positioning sensors (204), store the sensor data (244), and provide copies of the sensor data (244) to other entities. When providing the above noted functionality, the asset (202) may cooperate with other entities of the system of FIG. 1 to provide, for example, the functionality of the deployment, the asset mapper, and/or the client.

Figure 3:
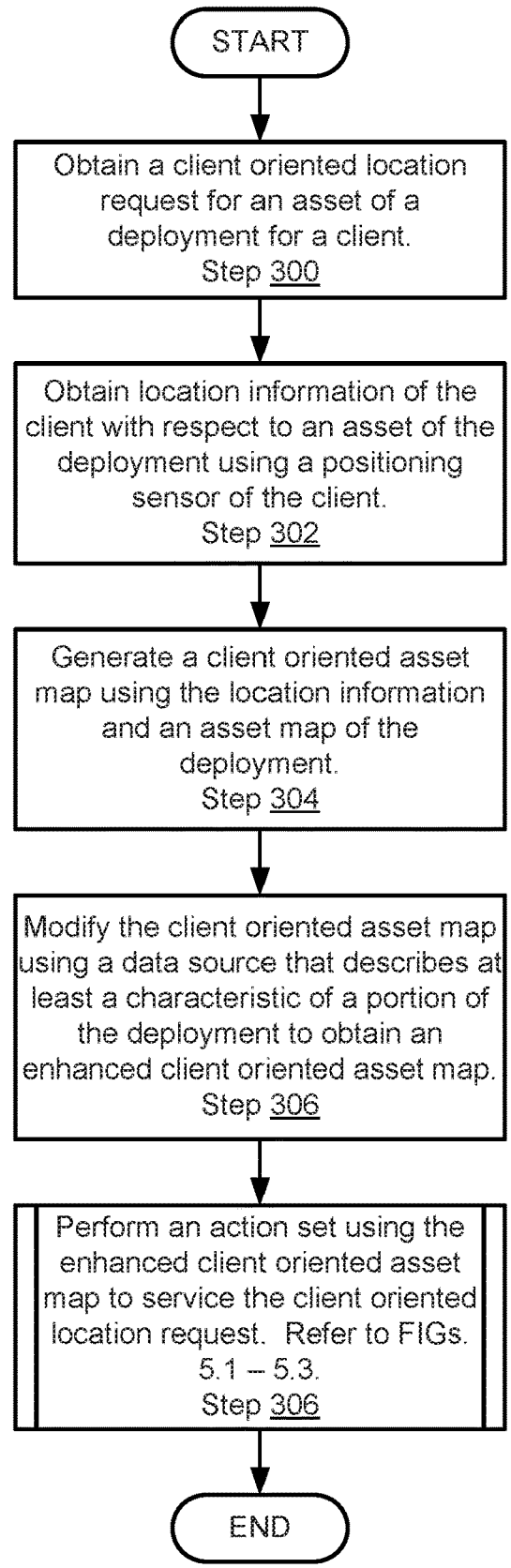
FIG. 3 shows a flowchart of a method of managing a deployment in accordance with one or more embodiments of the invention.

When providing the above noted functionality, the asset manager (230) may perform all, or a portion, of the methods illustrated in FIGS. 3-5.3.

The positioning sensors (204) may be physical devices that provide sensing services. Sensing services may include (i) obtaining sensor data (e.g., measurements) and (ii) providing the sensor data to the asset manager (230) and/or other entities.

In one or more embodiments of the invention, the positioning sensors (204) are implemented as photonic sensors (e.g., sensors that utilize electromagnetic radiation at optical and/or near optical frequencies) that are adapted to identify the location, orientation, and/or other telemetry information of other entities with respect to the positioning sensors. To provide the aforementioned functionality, the positioning sensors may include, for example, optical resonators, optical transceivers, data processors, and/or other types of hardware devices that are able to sense the position, orientation, and/or other telemetry information regarding other photonic sensors in the vicinity of the photonic sensor.

For example, the positioning sensors (204) may (i) emit electromagnetic radiation and measuring the scattering of the electromagnetic radiation and/or (ii) measure electromagnetic radiation emitted by other positioning sensors to identify a distance between the positioning sensors and another entity, a direction with respect to the asset towards another entity, an orientation of the asset with respect to another entity, an orientation of another entity with respect to the asset, and/or other kinds of information describing the relative positioning and orientation of the asset with respect to other entities.

The positioning sensors (204) may be implemented using other types of sensors without departing from the invention.

While the assets illustrated in FIG. 2.1 are illustrated as including a single positioning sensor disposed on a single location of the asset, assets may include any number of positioning sensors disposed on any number of portions at any number of locations on the assets without departing from the invention.

When providing the above noted functionality, the positioning sensors (204) may perform all, or a portion, of the methods illustrated in FIGS. 3-5.3.

In one or more embodiments of the invention, the storage (240) includes devices that provide data storage services (e.g., storing data and providing copies of previously stored data). The devices that provide data storage services may include hardware devices and/or logical devices. For example, the storage (240) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (240) may include a memory device (e.g., a dual in line memory device) in which data is stored and from which copies of previously stored data are provided. In another example, the storage (240) may include a persistent storage device (e.g., a solid state disk drive) in which data is stored and from which copies of previously stored data is provided. In a still further example, the storage (240) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (240) may store data structures including an asset description (242) and sensor data (244). Each of these data structures is discussed below.

The asset description (242) may be a data structure that includes information regarding the hardware, software, information regarding the environment in which the asset resides (e.g., network connectivity information, neighboring devices identified using proximity sensors, identifiers of frames or other structures in which the asset (202) is housed, etc.), and/or other aspects of the asset (202) such as workloads being performed by the asset (202), associations between the asset (202) and an organization, etc. The asset manager (230) may maintain the asset description (242) as aspects of the asset (202) change due to, for example, hardware, software, and/or changes in the environment proximate to the asset (202). For example, the asset manager (230) may modify the contents of the asset description (242) so that the asset description (242) includes up to date information regarding the asset (202).

The sensor data (244) may be a data structure that includes any quantity of data obtained from the positioning sensors (204). For example, the sensor data (244) may include data reflecting measurements made by the positioning sensors (204). The sensor data (244) may include any type and quantity of sensor data.

While the storage (240) has been illustrated as including data structures that include a limited amount of specific information, any of the data structures stored in the storage (240) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset (202) is illustrated in FIG. 2.2 as including a limited number of specific components, an asset in accordance with embodiments of the invention may include additional, fewer, and/or different components from those illustrated in FIG. 2.2 and/or discussed above without departing from the invention.

As discussed above, the asset mapper (120) of FIG. 1 may generate, maintain, and/or provide asset maps and/or client oriented asset maps. FIG. 2.3 shows a diagram of the asset mapper (120) in accordance with one or more embodiments of the invention.

The asset mapper (120) may provide mapping services for deployments. To provide the aforementioned functionality, the asset mapper (120) may include a map manager (250) and storage (240). Each of these components of the asset mapper (120) is discussed below.

The map manager (250) may be implemented using physical and/or logical devices. For example, the map manager (250) may be implemented using computer readable instructions (e.g., program code) that when executed by the computing resources of the map manager (250) give rise to the functionality of the map manager (250). In another example, the map manager (250) may be implemented using special purpose hardware devices such as, for example, programmable gate arrays, application specific integrated circuit, or another type of hardware device that provides the functionality of the map manager (250) by including circuitry adapted to provide the aforementioned functionality. In a still further example, the map manager (250) may be implemented using a combination of computer readable instructions (e.g., program code) and special purpose hardware devices.

The map manager (250) may provide the mapping services of the asset mapper (120). Mapping services may include (i) generating asset maps (264) using information obtained from assets (e.g., the positions and/or orientation of the assets with respect to each other) of a deployment and asset descriptions (262) and (ii) generating client oriented asset maps (266) using asset maps (264) and information obtained from clients (e.g., the position and/or orientation of a client with respect to at least one asset of a deployment). The asset mapper (120) may also enhance asset maps and/or client oriented asset maps to include additional information regarding the deployment. Enhanced and unenhanced maps may be utilized by the client or other entities to more efficiently and/or accurately identify the location of assets within a deployment, identify information regarding the assets of the deployment, and/or otherwise improve the use of the deployment. The maps may be utilized for other purposes without departing from the invention.

When providing the above noted functionality, the map manager (250) may perform all, or a portion, of the methods illustrated in FIGS. 3-5.3.

In one or more embodiments of the invention, the storage (260) includes devices that provide data storage services (e.g., storing data and providing copies of previously stored data). The devices that provide data storage services may include hardware devices and/or logical devices. For example, the storage (260) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (260) may include a memory device (e.g., a dual in line memory device) in which data is stored and from which copies of previously stored data are provided. In another example, the storage (260) may include a persistent storage device (e.g., a solid state disk drive) in which data is stored and from which copies of previously stored data is provided. In a still further example, the storage (260) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (260) may store data structures including asset descriptions (262), asset maps (264), and client oriented asset maps (266). Each of these data structures is discussed below.

The asset descriptions (262) may be a data structure that includes information regarding the assets of the deployment. For example, asset descriptions (262) may specify that assets that are included in each of the asset collections. In other words, the assets that are included in each of the racks or other organizational structures/asset enclosures of the deployment. The asset descriptions (262) may include additional (e.g., enhanced maps), different, and/or less information regarding the assets of the deployments without departing from the invention.

The asset descriptions (262) may be implemented as, for example, a table where each row is associated with an asset collection and the columns of the row include identifiers of assets that are disposed in the asset collection associated with the row. The asset descriptions (262) may be maintained, at least in part, by, for example, an administrator, technician, and/or other persons. The asset descriptions (262) may be maintained, at least in part, by, for example, the assets and the map manager (250). For example, the assets may identify other assets operably connected to each other by a networking device of an asset enclosure. Based on the identification, the assets may determine that each of the connected assets is likely to be part of a similar asset collection. The assets may provide such information to the map manager (250) which, in turn, may update the asset descriptions (262) based on the information obtained from the assets.

The assets may provide other types of information to the map manager (250) regarding the likely member of the assets with respect to asset collections without departing from the invention. For example, the assets may utilize sensors to identify other assets that are in close proximity to other assets. Based on the identification, the assets may determine that, due to proximity, the assets are members of asset collections.

The asset maps (264) may be a data structure that includes asset maps of assets of deployments. The asset maps (264) may specify, for example, the relative position, orientation, and/or other information of assets with respect to other assets. The asset maps (264) may specify any amount of such information without departing from the invention.

The client oriented asset maps (266) may be a data structure that includes client oriented asset maps of assets of deployments that are keyed (e.g., oriented with respect to) a location and/or orientation of respective clients. The client oriented asset maps may be dynamically generated. The client oriented asset maps (266) may specify, for example, the relative position, orientation, and/or other information of assets with respect to the position and/or orientation of respective clients. The client oriented asset maps (266) may specify any amount of such information without departing from the invention. For additional details regarding client oriented asset maps, refer to FIG. 2.5.

The asset maps (264) and/or the client oriented asset maps (266) may be enhanced to include additional information regarding the deployment. In other words, include additional information beyond a description of the relative position and/or orientation of the assets of the deployment. For example, an enhanced client oriented asset map may also specify applications hosted by an asset, workloads being performed by the asset, associations between the asset and organizations (e.g., owners or users of the assets), and/or other types of information regarding the asset.

While the storage (260) has been illustrated as including data structures including a limited amount of specific information, any of the data structures stored in the storage (260) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset mapper (120) is illustrated in FIG. 2.3 as including a limited number of specific components, an asset mapper in accordance with embodiments of the invention may include additional, fewer, and/or different components from those illustrated in FIG. 2.3 and/or discussed above without departing from the invention.

As discussed above, the client (130) of FIG. 1 may facilitate management of a deployment. FIG. 2.4 shows a diagram of the client (130) in accordance with one or more embodiments of the invention.

As discussed above, the client (130) may provide deployment management services. To provide the aforementioned functionality, the client (130) may include applications (270), positioning sensors (204), a deployment manager (272), and storage (280). Each of these components of the client (130) is discussed below.

The applications (270) may be implemented using physical and/or logical devices. For example, the applications (270) may be implemented using computer readable instructions (e.g., program code) that when executed by the computing resources of the application (270) give rise to the functionality of the applications (270). In another example, the applications (270) may be implemented using special purpose hardware devices such as, for example, programmable gate arrays, application specific integrated circuit, or another type of hardware device that provides the functionality of the applications (270) by including circuitry adapted to provide the aforementioned functionality. In a still further example, the applications (270) may be implemented using a combination of computer readable instructions (e.g., program code) and special purpose hardware devices.

The applications (270) may provide any number of computer implemented services for managing a deployment (and/or providing other types of services). The computer implemented services may include (i) analyzing asset maps and/or client oriented asset maps to identify whether particular assets are present in a deployment, (ii) analyzing asset maps and/or client oriented asset maps to identify whether hardware and/or software components of a deployment should be replaced, updated, or otherwise modified, (iii) coordinating with other clients to provide deployment management services, (iv) generating renderings or other visualizations of deployments using asset maps and/or client oriented asset maps, (v) generating action plans for users of the client to service the deployment, and/or (vi) other services to facilitate management of deployments. When providing computer implemented services, the applications (270) may generate application data (282) that reflects the services provided by the applications (270).

When the applications (270) provide their functionality, the application (270) and/or other entities may invoke the functionality of the deployment manager (272), discussed below. For example, one or more of the applications (270) may invoke the functionality of the deployment manager (272) by sending a request for a visualization of the deployment. In response, the deployment manager (272) may obtain a client oriented asset map, that is keyed to the location and/or orientation of the client (130), for the deployment and generate a visualization or other representation of the deployment using the client oriented asset map. To do so, the deployment manager (272) may invoke the functionality of the positioning sensors (204) to identify the location and/or orientation of the client (130) with respect to an asset of the deployment. The location and/or orientation of the client (130) may be used in combination with an asset map of the deployment to generate a client oriented asset map.

When providing the above noted functionality, the applications (270) may perform all, or a portion, of the methods illustrated in FIGS. 3-5.3.

The deployment manager (272) may be implemented using physical and/or logical devices. For example, the deployment manager (272) may be implemented using computer readable instructions (e.g., program code) that when executed by the computing resources of the deployment manager (272) give rise to the functionality of the deployment manager (272). In another example, the deployment manager (272) may be implemented using special purpose hardware devices such as, for example, programmable gate arrays, application specific integrated circuit, or another type of hardware device that provides the functionality of the deployment manager (272) by including circuitry adapted to provide the aforementioned functionality. In a still further example, the deployment manager (272) may be implemented using a combination of computer readable instructions (e.g., program code) and special purpose hardware devices.

The deployment manager (272) may provide deployment visualization services. Deployment visualization services may include (i) obtaining and providing sensor data (e.g., location information of the client with respect to one or more assets) from the positioning sensors (204), (ii) obtaining one or more client oriented asset maps (286), associated with respective deployments, that are based, at least in part, on the provided sensor data, and (iii) generating visualizations (e.g., renderings that may be displayed) of deployments using the client oriented asset maps (286). The generated visualizations may include, for example, overlays that provide additional information regarding the deployment. The overlays may illustrate or otherwise indicate (i) applications hosted by physical assets, (ii) workloads being performed by physical assets, (iii) associations between the assets and organizations, (iv) actions (e.g., movement to specified locations relative to the deployment, modifications of interconnections between different assets, etc.) to be performed to manage the assets of the deployment, and/or (v) other types of information that may be used to manage the deployment. Such visualizations may be utilized by clients or other entities to more efficiently and/or accurately identify the location of assets within a deployment. The visualizations may be utilized for other purposes without departing from the invention.

When providing the above noted functionality, the deployment manager (272) may perform all, or a portion, of the methods illustrated in FIGS. 3-5.3.

The positioning sensors (204) may be similar to the positioning sensors (204) described with respect to FIG. 2.2. For example, the positioning sensors (204) may generate sensor data (284). The deployment manager (272) may utilize the positioning sensors (204) (e.g., take measurements using the positioning sensors) to identify a relative location and/or orientation of the client (130) with respect to one or more assets of the deployment. The position and/or orientation of the client (130) may be used to define a point of view of client oriented asset maps. In other words, the client oriented asset maps generated using the position and/or orientation of the client (130) may be oriented with respect to the position/orientation.

In one or more embodiments of the invention, the storage (280) includes devices that provide data storage services (e.g., storing data and providing copies of previously stored data). The devices that provide data storage services may include hardware devices and/or logical devices. For example, the storage (280) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (280) may include a memory device (e.g., a dual in line memory device) in which data is stored and from which copies of previously stored data are provided. In another example, the storage (280) may include a persistent storage device (e.g., a solid state disk drive) in which data is stored and from which copies of previously stored data is provided. In a still further example, the storage (280) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (280) may store data structures including application data (282), sensor data (284), and client oriented asset maps (286). Each of these data structures is discussed below.

The application data (282) include one or more data structures that include data generated and/or utilized by the applications (270). The application data (282) may include any quantity and/or type of data.

The sensor data (284) may include one or more data structures that include data obtained using the positioning sensors (204). In other words, data regarding the position and/or orientation of the client (130) with respect to an asset of a deployment. The sensor data (284) obtained using the positioning sensors (204) of the client (130) may be used in combination with one or more asset maps to generate one or more of the client oriented asset maps (286).

The client oriented asset maps (286) may include one or more data structures that include client oriented asset maps. As discussed above, a client oriented asset map may specify the location and/or orientation of assets of a deployment with reference to the position and/or orientation of the client (130) with respect to the assets of the deployment. The client oriented asset maps (286) may be utilized by the applications (270) and/or the deployment manager (272) to provide information to a user of the client that may enable the user of the client (130) to more efficiently identify assets of the deployment.

In one or more embodiments of the invention, the client oriented asset maps (286) are enhanced with additional information beyond that of the relative locations and/or orientations of the assets of the deployment with respect to a client. For example, the client oriented asset maps (286) may be enhanced to include information regarding the applications hosted by the assets, the workloads being performed by the assets, associations between the assets and organizations, and/or other types of information that may be used to manage a deployment. By doing so, the cognitive burden on a person tasked with managing a deployment may be reduced.

For example, such information may be used to discriminate which of the assets are currently in use servicing workloads from those assets that are not currently in use. The aforementioned information may be used by a person to ascertain whether temporarily disabling, removing, or otherwise impacting the ability of an asset to service a workload will negatively impact performance of workloads by the deployment.

While the storage (280) has been illustrated as including data structures that include a limited amount of specific information, any of the data structures stored in the storage (280) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the client (130) is illustrated in FIG. 2.4 as including a limited number of specific components, a client in accordance with embodiments of the invention may include additional, fewer, and/or different components from those illustrated in FIG. 2.4 and/or discussed above without departing from the invention.

As discussed above, client oriented asset maps may include information that may be used to manage a deployment. FIG. 2.5 shows an example of a client oriented asset map (290) in accordance with one or more embodiments of the invention.

As noted above, the example client oriented asset map (290) may information regarding the deployment including, for example, positional information regarding the relative location and orientation of assets with respect to a client, descriptions of the asset collections to which the assets belong, descriptions regarding the entities hosted by the assets and/or associations between the assets and other entities, and/or other types of information regarding the deployment. The example client oriented asset map (290) may include any number of entries (e.g., 292, 298) that each include portions of the aforementioned information. Each of the entries may be associated with a respective asset of the deployment.

The entries may include topology information (294), an asset description (295), and an asset collection identifier (296). The topology information (294) may specify the relative position, orientation, and/or other information regarding the relative position of the associated asset with respect to a client. The asset description (295) may specify information regarding the associated asset such as, for example, the applications hosted by the associated asset, the workloads being performed by the associated asset, organization(s) associated with the asset (e.g., owners of workloads being performed by the associated asset), and/or other information regarding the asset. The asset collection identifier (296) may include an identifier of an asset collection to which the asset belongs, a description of the asset collection to which the associated asset belongs, and/or a description of the relationship between the asset collection and other asset collections of the deployment.

While the entries of the example client oriented asset map (290) have been illustrated and described as including a limited amount of specific information, the entries of the example client oriented asset map (290) may include additional, different, and/or less information without departing from the invention. Additionally, while the example client oriented asset map (290) has been described as including a number of entries (e.g., a list), the example client oriented asset map (290) may be implemented using other types of structures (e.g., tables, database, etc.) without departing from the invention. Similarly, any of the data structures described with respect to FIGS. 1-2.5 may be implemented as, for example, lists, tables, databases, linked lists, and/or any other type of data structure.

As discussed above, the system of FIG. 1 may provide deployment management services. FIGS. 3-5.3 show methods that may be performed by components of the system of FIG. 1 to provide deployment management services.

FIG. 3 shows a flowchart of a method in accordance with one or more embodiments of the invention. The method depicted in FIG. 3 may be used to respond to client oriented location requests in accordance with one or more embodiments of the invention. The method shown in FIG. 3 may be performed by, for example, an asset mapper (e.g., 120, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a client oriented location request for an asset of a deployment for a client is obtained. The client oriented location request may be a request for information to be provided that may enable the location of the asset of the deployment to be efficiently identified.

In one or more embodiments of the invention, the client oriented location request is a specific request for information specifying the location of a particular asset. In other words, where an asset resides in a deployment.

In one or more embodiments of the invention, the client oriented location request is for a map of assets of the deployment in proximity to a client. For example, a technician, administrator, or other personnel may be near a portion of the deployment and is requesting information that may enable the user of the client to efficiently identify the assets that are proximate to the client.

The client oriented location request may request additional information unrelated to the location of the asset. For example, the client oriented location request may request information regarding the applications hosted by assets of the deployment, the workloads being performed by assets of the deployment, associations between the assets and organizations, and/or other types of information unrelated to the location of the assets of the deployment.

In step 302, location information of the client with respect to an asset of the deployment is obtained using one or more positioning sensors of the client. The location information may be obtained by invoking the functionality of the positioning sensors of the client. Invoking the functionality of the positioning sensors may, for example, cause the positioning sensors to generate and/or sense electromagnetic radiation in and/or near an optical frequency band. The emitted and sensed electromagnetic radiation may be utilized to estimate a location and/or orientation of an asset nearest to the client.

When emitting and/or sensing electromagnetic radiation, the positioning sensors of the client may cooperate with positioning sensors of the asset. For example, the positioning sensors on each of the aforementioned devices may emit electromagnetic radiation at predetermined times, in predetermined patterns, and/or in other manners adapted to enable the position and/or orientation of the client with respect to the asset to be determined.

After the aforementioned sensor data is obtained, the sensor data may be validated by obtaining similar position and/or orientation information with respect to a second asset that is generally collocated with the asset. For example, the second asset may be part of the same asset collection as the asset from which the first sensor data was obtained. The second asset may be identified based on asset descriptions (262) described with respect to FIG. 2.3.

In step 304, a client oriented asset map is generated using the location information and an asset map of the deployment. The client oriented asset map may be generated by shifting a reference point/orientation of the asset map to position/orient the asset map with respect to the client. For example, the 0, 0 of the asset map may be shifted so that the location of the client is the 0, 0 point. The asset map may also be rotated or otherwise manipulated to orient the asset map with respect to the orientation of the client. By doing so, visualizations of the deployment with respect to the location and/or orientation of the client may be efficient generated by virtue of the client oriented asset map being keyed to the location of the client.

For example, consider a scenario where an asset map is keyed to a component of an asset that is south of the location of the client within the deployment. In such a scenario, the positions of the assets with the respected to the keyed asset may be modified to shift the keyed location to the location of the client.

To generate the client oriented asset map, linear transformations or other tools for mapping the relative locations/orientations of the assets included in the asset map may be applied to the information included in the asset map to generate the client oriented asset map. For example, a linear transformation (e.g., position/orientation transformation) may be generated based on the location information obtained from the client.

In step 306, the client oriented asset map is modified using a data source that describes at least a characteristic of a portion of the deployment to obtain an enhanced client oriented asset map.

In one or more embodiments of the invention, the client oriented asset map is modified by adding information regarding the at least one characteristic of the portion of the deployment to the client oriented asset map. By doing so, the client oriented asset map may include information regarding at least one asset of the deployment that is unrelated to the relative position and/or location of the asset with respect to the client.

For example, consider a scenario in which the data source specifies associations between the assets and organizations. In such a scenario, the client oriented asset map may be modified by adding the aforementioned information to corresponding entries. By doing so, a new dimension of information regarding the assets of the deployment may be added to the client oriented asset map. The new dimension may be used, for example, to enhance renderings of the deployment. The enhancements may be implemented as, for example, overlays added to renderings of the deployment. Consequently, the resulting renderings may display multidimensional information regarding the assets of the deployment.

In step 308, an action set is performed using the enhanced client oriented asset map to service the client oriented location request.

In one or more embodiments of the invention, the action set includes generating and displaying a visualization (e.g., generating a rendering and displaying the rendering on a display) of the deployment with respect to the position and/or orientation of the client. For example, the visualization may include a representation of asset collections of the deployment (e.g., racks or other structures) and the assets of each of the asset collections (e.g., rack mount chassis housing components) that would be within a field of view of a person having a similar location and/or orientation of the client. For an example of such visualizations, refer to FIG. 6.-6.9.

The visualizations may also include, for example, overlays in the form of indicators that highlight one or more of the assets, indicators of identifiers of the assets, indicators or identifiers of information regarding the assets (e.g., applications hosted by the assets, workloads being performed by the assets, associations regarding the assets, etc.). Such information may be used to reduce the cognitive burden on personnel tasked with working with/on the assets of the deployment.

The visualizations may be dynamically generated. In other words, the visualizations may change depending on the position and/or orientation of the client. By doing so, the personnel may utilize the client to efficiently scan a deployment for relevant assets.

The visualization may be generated using, for example, one or more client oriented asset maps and/or other information such as a description of assets of a deployment. The description of the assets of the deployment may be utilized to generate a rendering of the asset collections.

For example, the description of the assets may indicate a type of frame, housing, or other structure utilized to house the assets of the asset collection. The type of frame, housing, or other structure may be matched to a library of pre-rendered representations of such frames, housing, or other structures. The pre-rendered representations may be position and/or orientation dependent. Consequently, pre-rendered representations of the frame, housing, or other structures for each potential position and/or orientation of the client (in other words, view angle/view position) with respect to each asset collection may be obtained.

Similarly, the description of the assets may indicate a type of chassis utilized by each of the assets of the asset collection. Pre-rendered representations (similar to those of the frame, housing, or other structure) of the chassis may also be available.

The representations of the asset collections may be generated using the pre-rendered representations of the assets and/or the frames, housing, or other structures used to house the assets of the asset collection. The representations of the asset collections may be used to generate a visualization of the deployment from a point of view of the client.

The visualization of the deployment may be generated via other methods without departing from the invention.

Once rendered, the visualization may be, for example, displayed to a user of a client, provided to an application, or integrated into a graphical user interface of an application. The aforementioned graphical elements may be displayed to the user of the client and/or other users (e.g., personnel disposed at other locations) via displays of the aforementioned devices.

In one or more embodiments of the invention, the visualization is a three dimensional depiction of a portion (or all) of the deployment. The visualization may be a two dimensional depiction of a portion (or all) of the deployment without departing from the invention. For example, the visualization may be a top down view of the deployment and include an icon representing the location of the client within the environment. Additionally, the field of view from the location of the client may be indicated in the depiction (e.g., a shaded area or other visual indicator may be used to indicate the field of view).

In one or more embodiments of the invention, the visualization is interactive. For example, the portions of the visualization corresponding to assets may be interacted with by clicking (using, for example, a pointing device such as a mouse), touching (if, for example, the client includes a touch sensitive display), or otherwise selecting using input-output functionality of the client. Upon being interacted with, additional information regarding the corresponding asset may be displayed. For example, a description of a location of the asset within an asset collection (e.g., the second rack from the top, the third rack from the bottom, etc.) may be displayed as a superimposed overlay.

In another example, an overlay may be placed on the rendering to add dimensions to the visualization. As discussed above, the client oriented asset maps may be enhanced by adding additional dimensions of information to the maps. Overlays corresponding to the additional dimensions may be added to the renderings to visually illustrate the multidimensional information included in the client oriented asset maps.

In one or more embodiments of the invention, the action set is performed via one or more of the methods illustrated in FIGS. 5.1-5.3.

The method may end following step 308.

Using the method illustrated in FIG. 3, a system in accordance with embodiments of the invention may provide information that may enable assets of a deployment to be efficiently identified, modified, and/or otherwise interacted with by a person. The information provided may include visualizations of the deployment with additional information (e.g., multidimensional information) that is not physically present in the deployment. For example, highlights of assets and corresponding identifiers of assets may be provided as part of visualizations of the deployment. The aforementioned highlights and identifiers may not be physically present in the deployment but, when present in the rendering, enable each of the assets of the deployment to be efficiently identified.

As discussed with respect to FIG. 1, the system of FIG. 1 may maintain asset maps of deployment to provide deployment management services. FIGS. 4.1 and 4.2 illustrate methods that may be used to maintain asset maps of deployments.

FIG. 4.1 shows a flowchart of a method in accordance with one or more embodiments of the invention. The method depicted in FIG. 4.1 may be used to maintain an asset map when an asset is added to a deployment in accordance with one or more embodiments of the invention. The method shown in FIG. 4.1 may be performed by, for example, an asset (e.g., 106, FIG. 1). Other components of the system in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a network that includes assets is identified. For example, the network may be a peer to peer network maintained by assets of a deployment. The peer to peer network may, for example, be a gossip network. The network may be other types of networks without departing from the invention.

The network may be identified using communications resources of the asset. For example, the asset may include hardware components such as transceivers adapted to send and receive data via a wireless network. The wireless network may support the network utilized by the assets to communicate with one another.

In step 402, an identity of the asset is provided to the assets of the deployment using the network. For example, the identity may be provided by transmitting the identity to the assets using the network. The identity of the asset may be correlated with an asset description of the deployment.

In step 404, location information with respect to the assets is provided using one or more positioning sensors. The location information may be obtained similarly to that obtained by the client as described with respect to FIG. 3. The location information may also be provided to an asset mapper.

In step 406, an asset map of the deployment is updated based on the location information and an asset description of the asset. The location information may be added to the asset map or used to modify an existing portion of the asset map to update the asset map. The asset description may be similarly used to update the asset map.

For example, when an asset is moved within the deployment, the asset may be depowered causing the asset to be removed from a network of the deployment. When the asset is powered on or a new asset is added, the asset may automatically join the network which causes the asset to perform the method illustrated in FIG. 4.1.

In another example, overtime the applications hosted by an asset may change. When the asset joins a network, the asset map perform the method illustrated in FIG. 4.1 resulting in the asset map being updated to include the change in the applications hosted by the asset.

The asset map may be updated by an asset mapper that provides mapping services for the deployment.

The method may end following step 406.

Using the method illustrated in FIG. 4.1, a system in accordance with embodiments of the invention may maintain an asset map of a deployment as assets are added to or relocated within the deployment.

FIG. 4.2 shows a flowchart of a method in accordance with one or more embodiments of the invention. The method depicted in FIG. 4.2 may be used to maintain an asset map when an asset is added to a deployment in accordance with one or more embodiments of the invention. The method shown in FIG. 4.2 may be performed by, for example, an asset or an asset mapper (e.g., 106, 120, FIG. 1). Other components of the system in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, an asset that has joined a network of a deployment is identified. The asset may be identified using an identifier of the asset provided by the asset via the network. For example, the asset may notify other entities on the network of the identity of the asset when the asset joins the network.

In step 422, it is determined whether the asset is a member of the deployment. The determination may be made by comparing the identifier of the asset to a description of the assets of the deployment. In other words, the identifier may be matched to similar identifiers included in the description of the assets of the deployment. If the identifier is matched to an identifier specified by the description of the assets, the asset may be determined as being a member of the deployment. If the identifier does not match any identifier specified by the description of the assets, the asset may be determined as not being a member of the deployment.

The determination may be made via other methods without departing from the invention. For example, a listing of hardware, software, and/or other components of the asset may be matched to similar descriptions of the hardware, software, and/or other components of members of the deployment.

If it is determined that the asset is a member of the deployment, the method may proceed to step 424. If it is determined that the asset is not a member of the deployment, the method may end following step 422. For example, the asset may be kicked off the network or otherwise not allowed to join the deployment following step 422.

In step 424, (i) location information of the asset with respect to other assets of the deployment is obtained using one or more positioning sensors and (ii) an asset description for the asset is obtained. The location information may be obtained similarly to that obtained by the client as described with respect to FIG. 3. The asset description may be obtained from the asset. In other words, each asset may maintain its own asset description. For example, as the applications hosted by an asset change, the asset may update its description to reflect the changes in the hosted applications. The location information and/or asset description may also be provided to an asset mapper.

In step 426, an asset map of the deployment is updated based on the location information and the asset description. The location information and/or the asset description may be added to the asset map or used to modify an existing portion of the asset map to update the asset map.

The asset map may be updated by an asset mapper that provides mapping services for the deployment.

The method may end following step 4.2.

Using the method illustrated in FIG. 4.2, a system in accordance with embodiments of the invention may maintain an asset map of a deployment as assets are added to or relocated within the deployment.

In addition to the above methods, the system of FIG. 1 may monitor the location of assets within a deployment and maintain a corresponding asset map based on the monitoring. The positioning sensors of the assets may be used to identify changes in the positions and/or orientations of the assets based on changes in sensor data.

For example, when assets are repositioned within the deployment, the signal level of electromagnetic radiation measured by a first positioning sensor when a second positioning sensor radiates electromagnetic radiation. Such changes may cause the system of FIG. 1 to use the sensors to obtain location information to update the asset map.

Similarly, when an asset leaves or otherwise becomes unavailable on a network for a period of time, the system of FIG. 1 may automatically attempt to obtain location information using position sensors of the asset. The asset map may be corresponding updated based on the obtained location information (e.g., if sensor data cannot be obtained because the asset has been removed, the asset may be similarly removed from the asset map).

As the asset map is updated, historical information regarding the asset map may be maintained. For example, the asset map may be implemented using a data structure that includes changes to the asset map. Changes to the asset map may be time stamped or otherwise marked to indicate the periods of time during which the changes to the deployment occurred. Consequently, changes to the deployment and/or the state of the deployment at previous points in time may be identified using the information included in the asset map.

As discussed above, renderings of deployments may be generated and displayed as visualizations. FIGS. 5.1-5.3 show methods that may be performed to perform action sets as described with respect to FIG. 3. During performance of action sets, renderings of deployments may be generated.

FIG. 5.1 shows a flowchart of a method in accordance with one or more embodiments of the invention. The method depicted in FIG. 5.1 may be used to perform an action set in accordance with one or more embodiments of the invention. The method shown in FIG. 5.1 may be performed by, for example, a client (e.g., 130, FIG. 1). Other components of the system in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a client oriented simplified rendering of a deployment is generated based on a client oriented asset map. The client oriented simplified rendering may be, for example, a two dimensional top down view of the deployment. The rendering may be generated based on the topology information included in the entries of the client oriented asset map.

In step 502, an indicator of a portion of the deployment is overlaid on the client oriented simplified rendering. The indicator may be based on all, or a portion, of an asset description included in an entry of the client oriented asset map.

The indicator may be, for example, a text box, widget, shading element, outline pattern, or other graphical indicator. The type of indicator may correspond to a dimension of the information included in the asset description.

For example, the client oriented simplified rendering may be a two dimensional representation of the deployment. The two dimensional representation may include boxes or other shapes indicating the asset collections of the deployment. The indicator of the portion of the deployment may be, for example, a fill pattern added to one of the shapes of the boxes. The fill pattern may correspond to, for example, an application hosted by the portion of the deployment.

Any number of indicators (e.g., an indicator group) may be overlaid over any number of portions of the deployment. Each of the indicators may correspond to the same dimension thereby adding an additional dimension of information (e.g., in addition to the spatial dimensions shown in the two dimensional representation) to the rendering.

Any number of indicator groups may be overlaid to add as many additional dimensions of information to the rendering as desired by a user. Each of the indicator groups may utilize different graphical methods to illustrate the information corresponding to the indicator groups. For example, a first indicator group may utilize fill patterns to represent a dimension of information, a second indicator group may utilize outlining patterns (e.g., dashing patterns) to represent a second dimension of information, a third indicator group may utilize text boxes to represent a third dimension of information, etc.

The graphical methods utilized to illustrate the information may be user selectable. For example, a menu presented to a user may enable the user to select a desired method of graphically representing each of the indicator groups.

In step 504, an indicator of a path to the portion of the deployment is overlaid on the client oriented simplified rendering. The indicator may be, for example, a line from a position of the client in the client in the rendering to the portion of the deployment. The line may, when followed by a user of the client, lead the user of the client to the portion of the deployment. Other types of indicators may be utilized without departing from the invention. For example, a series of shapes (e.g., circles) may be added along the path to indicate the path to a user.

The method may end following step 504.

FIG. 5.2 shows a flowchart of a method in accordance with one or more embodiments of the invention. The method depicted in FIG. 5.2 may be used to perform an action set in accordance with one or more embodiments of the invention. The method shown in FIG. 5.2 may be performed by, for example, a client (e.g., 130, FIG. 1). Other components of the system in FIG. 1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a client oriented rendering of a deployment is generated based on a client oriented asset map. The client oriented rendering may be, for example, a three dimensional view of the deployment from a view point of the client.

In step 512, an indicator of a characteristic of a portion of the deployment depicted in the client oriented rendering is overlaid on the client oriented rendering. The indicator may be based on all, or a portion, of an asset description included in an entry of the client oriented asset map.

The indicator may be, for example, a text box, widget, shading element, or other graphical indicator. The type of indicator may correspond to a dimension of the information included in the asset description.

For example, the client oriented rendering may be a three dimensional representation of the deployment. The three dimensional representation may include isometric drawings of the asset collections and assets of the deployment. The indicator of the characteristic of the portion of the deployment may be, for example, a fill pattern added to one of the isometric drawings. In other words, the isometric drawings may be shaded in a manner corresponding to the fill pattern. The fill pattern may correspond to, for example, an application hosted by the portion of the deployment, a workload being performed by the portion of the deployment, an association between the portion of the deployment and an organization, and/or any other type of characteristic of the deployment included in the client oriented asset map (or included in another data structure that specifies an association between the portion of the deployment and a characteristic).

Any number of indicators (e.g., an indicator group) may be overlaid over any number of portions of the deployment. Each of the indicators may correspond to the same characteristic (e.g., dimension of data associated with the respective portions of the deployment) thereby adding an additional dimension of information (e.g., in addition to the spatial dimensions shown in the two dimensional representation) to the rendering.

Any number of indicator groups may be overlaid to add as many additional dimensions of information to the rendering as desired by a user. Each of the indicator groups may utilize different graphical methods to illustrate the information corresponding to the indicator groups. For example, a first indicator group may utilize fill patterns to represent a dimension of information, a second indicator group may utilize outlining patterns (e.g., dashing patterns) to represent a second dimension of information, a third indicator group may utilize text boxes to represent a third dimension of information, etc.

The graphical methods utilized to illustrate the characteristics may be user selectable. For example, a menu presented to a user may enable the user to select a desired method of graphically representing each of the indicator groups.

The method may end following step 512.

FIG. 5.3 shows a flowchart of a method in accordance with one or more embodiments of the invention. The method depicted in FIG. 5.3 may be used to perform an action set in accordance with one or more embodiments of the invention. The method shown in FIG. 5.3 may be performed by, for example, a client (e.g., 130, FIG. 1). Other components of the system in FIG. 1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a client oriented rendering of a deployment is displayed using a remote client. The remote client may be disposed away from the deployment. For example, the remote client may be being used by a technician or administrator from home. Consequently, the client oriented rendering of the deployment may be displayed to a person that is not near the deployment.

The client oriented rendering of the deployment may be depict the view of the deployment from a person that is proximate to the deployment. For example, a technician may be near the deployment and may be using a client. The client may perform the method illustrated in FIG. 5.2 and thereby generate a rendering. The rendering may be transmitted to the remote client which, in turn, may display the rendering on a display of the remote client.

In step 522, overlay update information is obtained using the remote client. For example, an input device of the remote client may be utilized to interact with the remote client to enable information to be obtained from a user of the remote client. The information obtained from the user of the remote client may be the overlay update information.

For example, the user of the remote client may use the input device to interact provide information regarding a portion of the rendering displayed via the remote client. The obtained information may be transmitted to the client to enable the client to obtain the overlay update information.

The overlay update information may include any type and quantity of information. For example, the overlay update information may obtain text information, selection information with respect to a portion of the rendering, or other types of information that may be obtained from the remote client.

In step 524, the client oriented rendering is updated based on the update information. For example, the client oriented rendering may be updated by removing overlays, modifying overlays, and/or adding overlays to the client oriented rendering.

The updated client oriented rendering may be displayed via the client.

Consequently, the information obtained by the remote client may be used to display information regarding the deployment via the client in a manner that is oriented to the client. Consequently, the cognitive burden on a user of the client may be reduced with respect to processing the information because it is displayed in a manner consistent with a view point of the user of the client.

The method may end following step 524.

Thus, via the methods illustrated in FIGS. 5.1-5.3, an action set may be performed to facilitate management of a deployment. The action set may result in the generation and/or display of renderings of the deployment that have the view points of the renderings keyed to the view point of a user of the client. By doing so, the cognitive burden on a user of the client for interpreting the displayed information may be reduced when compared to displaying such information in manners that are not keyed to the view point of the user of the client To further clarify embodiments of the invention, a non-limiting example is provided in FIGS. 6.1-6.9. FIG. 6.1 shows a system similar to that illustrated in FIG. 1. FIGS. 6.2-6.3 illustrate interactions between components and/or actions performed by the components of the system of FIG. 6.1 over time. FIG. 6.4 illustrates the addition of a client to the system of FIG. 6.1. FIG. 6.5 illustrates interactions between components and/or actions performed by the components of the system of FIG. 6.4 over time. FIG. 6.6 illustrates a first rendering generated by the system of FIG. 6.4. FIGS. 6.7-6.9 illustrate generation of a second rendering of the deployment of FIG. 6.1 by the system of FIG. 6.4.

For the sake of brevity, only a limited number of components of the system of FIG. 1 are illustrated in each of FIGS. 6.1-6.9.

Example

Consider a scenario as illustrated in FIG. 6.1 in which a third rack (620) is added to a deployment that includes a first rack (600) and a second rack (610). The first rack (600) includes a first compute unit (602) and a first storage unit (604). The second rack (610) includes a second compute unit (612) and a networking unit (614).

Prior to the addition of the third rack (620), the deployment was used by a leading automotive company to develop new car designs. However, due to the increasing computational cost of generating new car designs, the deployment of FIG. 5.1 was unable to continue to provide effective computer implemented design services to engineers of the automotive company.

To remedy this problem, the third rack (620), which includes a third compute unit (622), is added to the deployment. By adding the third compute unit (622) to the deployment, the deployment is able to provide effective computer implemented services.

Turning to FIGS. 6.2-6.3, the aforementioned figures illustrate interactions and actions between components of the system of FIG. 6.1. In these figures, the relative occurrence in time of the interactions progresses from the top of each figure (i.e., earlier in time) to the bottom of each figure (i.e., later in time). FIG. 6.3 is a continuation of the diagram of FIG. 6.2. In other words, element 630 indicates the first interaction that occurs in time while element 644 indicates the last interaction that occurs.

Turning to FIG. 6.2, at a first point in time, the third compute unit (622) sends a request to join a network (630) utilized by the deployment to the networking unit (614). In response, the networking unit (614) processes the join network request (632). While processing the join network request (632), the networking unit (614) verifies that the third compute unit (622) is a member of the deployment based on an identifier of the third compute unit (622) provided as part of the request to join the network (630).

In this example, because the third compute unit (622) is identified as a member of the deployment, the third compute unit (622) is allowed to join the deployment. Consequently, an update to the asset map of the deployment is triggered.

To update the asset map, the networking unit (614), an asset of the deployment, sends a request for location information (634) to the third compute unit. In response to the request for the location information (634), the third compute unit (622) initiates position sensing (636) with respect to the networking unit (614) using positioning sensors of the third compute unit (622) and the network unit (614) to obtain sensor data that specifies the location and/or orientation of the third compute unit (622) with respect to the networking unit (614).

After obtaining the sensor data from the positioning sensors, the third compute unit (622) obtains asset descriptions for the first rack and the second rack (638). The third compute unit (622) identifies that the second compute unit (612) is collocated with the network unit (614) based on the asset descriptions and initiates position sensing (640) with the second compute unit (612) to obtain second sensor data.

After obtaining the sensor data, the third compute unit (622) obtains the location information using the position sensing (642). In this example, the third compute unit (622) compares the sensor data obtained from the position sensing (636, 640) to verify that it is accurate. Specifically, the third compute unit (622) identifies that the sensor data indicates that both the second compute unit (612) and networking unit (614) are collocated as indicated by the asset descriptions. Consequently, the third compute unit (622) determines that the sensor data is accurate and uses the sensor data as the location information.

The third compute unit (622) updates the asset map using the location information (644), as illustrated in FIG. 6.3. To do so, the third compute unit (622) provides the location information to an asset mapper (not shown) which updates the asset map using the position sensing data.

By performing the above actions, the asset map of the deployment is updated based on location information obtained from the assets of the deployment.

Overtime, the system of FIG. 6.1 is utilized by the automotive company to design additional cars. However, at a second point in time, a processor of the third compute unit (622) is damaged rendering the deployment unable to provide its functionality.

To remedy the situation, a technician is dispatched to the deployment to replace the processor. The technician brings a client (650), as illustrated in FIG. 6.4, to the deployment because the technician is unfamiliar with the assets of the deployment. Consequently, it is difficult for the technician to identify the third compute unit (6222) of the deployment.

Turning to FIG. 6.5, the aforementioned figure illustrates interactions and actions between components of the system of FIG. 6.4. In this figure, the relative occurrence in time of the interactions progresses from the top of the figure (i.e., earlier in time) to the bottom of the figure (i.e., later in time). In other words, element 660 indicates the first interaction that occurs in time while element 670 indicates the last interaction that occurs.

After the technician enters the deployment, the technician needs to identify the first compute unit (602). To do so, the technician instructs the client (650) to generate a visualization of the deployment from the perspective of the technician which is directly in front of the first rack (600).

To do so, the client (650) initiates position sensing (660) with the nearest asset. In other words, the first compute unit (602). By performing the position sensing (660), sensor data is obtained using position sensors of the client (650) and the first compute unit (602).

After obtaining the sensor data, the client (650) sends an asset map and an asset descriptions request (662) to the first compute unit (602). In response, the first compute unit (602) provides the asset map and the asset descriptions (664) for the deployment.

The client (550) utilizes the asset descriptions to identify that the first storage unit (604) is collocated with the first compute unit (602). In response to the identification, the client (650) performs position sensing (666) with the first storage unit (604) to obtain second sensing data. Because sensing data obtained from both position sensing matches (e.g., similar position/orientation), the client (650) determines that the sensor data is accurate and uses the sensor data as location information that specifies the relative position and orientation of the client (650) with respect to the first compute unit (602).

The client (650) next obtains a client oriented asset map using the location information and the asset map (668). To do so, the client (650) provides the aforementioned data to an asset mapper which rekeys the asset map to the position and/or orientation of the client (650).

After obtaining the client oriented asset map, the client (650) generates a client oriented simplified rendering with path indicators (670) and displays the aforementioned rendering via a display to the technician. The technician who uses the client oriented simplified rendering with path indicators to identify the third compute unit (622).

FIG. 6.6 shows the client oriented simplified rendering (680). As seen from FIG. 6.6, the client oriented simplified rendering (680) is a two dimensional representation with a perspective of from above the deployment. Specifically, the client oriented simplified rendering (680) includes a first row that includes a first rack representation (682) of the first rack (600) and a second rack representation (684) of the second rack (600). The client oriented simplified rendering (680) further includes a second row that includes a third rack representation (686) of the third rack (620). The relative position and orientation of these elements matches that of the actual deployment. In the diagram, the front of the racks are indicated by the sides of the representations (682, 684, 686) having an additional rectangle (i.e., the lower portions of each of the representations in FIG. 6.6).

The client oriented simplified rendering (680) also includes a client representation (688) which represents the position and orientation of the client (and technician) with respect to the deployment. In FIG. 6.6, the client representation (688) is illustrated as a rectangle having a long side matched to a direction which the client is pointing.

The client oriented simplified rendering (680) also includes a future client representation (689) which represents the position and orientation of where the client needs to be disposed and oriented to replace the processor of the third compute unit. In FIG. 6.6 the future client representation (689) is illustrated as a rectangle outlined with a dotted line to enable the technician to easily discriminate from the current location and the future location.

The client oriented simplified rendering (680) also includes a path indicator in the form of an arrow from the client representation (688) and the future client representation (689).

Using the client oriented simplified rendering (680), the technician is able to move from the location of the client representation (688) to the location of the future client representation (689) in the data center.

After the technician moves to the location of the future client representation (689), the technician is located at an appropriate location in front of the third chassis. To identify where the processor to be replaced is located, the technician uses the client (650) to generate and display a client oriented rendering of the deployment. To further clarify the client oriented rendering generated by the client (650), diagrams of the visualization (650) as it is successively generated are illustrated in FIGS. 6.7-6.9.

FIG. 6.7 shows a first diagram of the visualization (750). In the first diagram, the client oriented asset map and asset descriptions have been utilized to add pre-rendered racks (752) to the visualization. The pre-rendered racks (752) include pre-rendered chassis (754) of the assets. In other words, the renderings of racks including chassis that reflect the location of the first compute unit (602), first storage unit (604), second compute unit (612), networking unit (614), and third compute unit (622). The pre-rendered racks (752) are shown in a two row form corresponding to the physical topology of the deployment.

In addition to the renderings of the racks and chassis, the visualization (750) includes the client representation (688) to further reduce the cognitive burden on the technician required to interpret the visualization.

FIG. 6.8 shows a second diagram of the visualization (750). In the second diagram, the asset descriptions have been utilized to highlight the pre-rendered chassis corresponding to the third compute unit. Specifically, a patterned representation of the third compute unit (752) has been added to the visualization. The patterned representation enables the technician to identify the compute unit in which the processor that is to be replaced is disposed. In FIG. 6.8, the pattern is show as a cross hatched fill patterns being superimposed over the third compute unit.

FIG. 6.9 shows a third diagram of the visualization (750). In the third diagram, the perspective has been shifted to correspond with the perspective a person would have if viewing the deployment for the position and orientation of the client representation (688). By changing the perspective to that of where the technician is likely to be disposed and oriented, the cognitive burden on the technician for interpreting the visualization may be reduced by keying the visualization to the technician's perspective.

Additionally, as illustrated in FIG. 6.9 a workload indicator (754) has been added to the representation. The workload indicator (754) includes a textual description that the third compute unit is performing a database workload. By adding the workload indicator to the visualization (750), the technician is proactively notified that temporarily disabling or otherwise suspending the operation of the third compute unit to change the processor of the third compute unit is likely to impact a specific subset of the functionality being performed by the deployment. Specifically, the technician is notified that suspending the operation of the third compute unit may delay performance of a database workload.

By being notified of the database workload, the technician may proactively address the database workload by shifting its performance to the first compute unit or the second compute unit prior to suspending operation of the third compute unit. By doing so, the technician may be able to replace the processor without negatively impacting the workloads being performed by the deployment.

End of Example

Thus, as illustrated in FIGS. 6.1-6.9, embodiments of the invention may provide a method and system for efficiently managing assets of a deployment. For example, by displaying visualizations that are (i) oriented with respect to a technician, administrator, or other person and/or (ii) include multidimensional information, the cognitive burden on the person for managing the deployment may be reduced.

Figure 7:
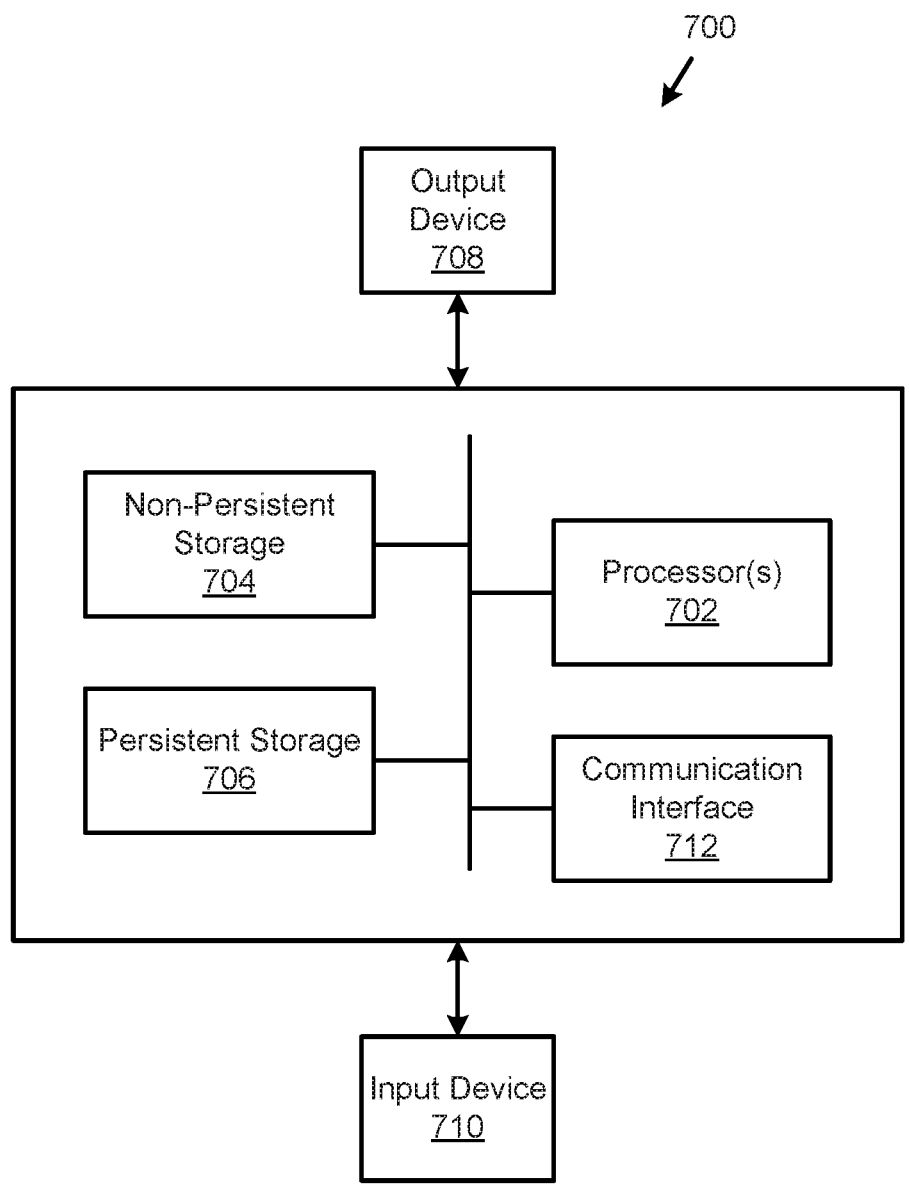
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a method for facilitating management of assets in a deployment. To do so, embodiments of the invention may provide a system that obtains enhanced client oriented asset maps and generates visualizations of the deployment based on the obtained asset maps. By doing so, visualizations depicting the physical assets, logical entities hosted by the physical assets, and/or other types of information regarding the physical assets may be provided to persons tasked with managing the deployment. Consequently, the persons tasked with managing the deployment may obtain information that may be used to (i) identify the physical assets of the deployment, (ii) ascertain whether modifications of an asset will impact the functionality of the deployment, (iii) enable remote persons to provide useful information regarding the deployment for management purposes, and/or (iv) identify organizations impacted by modifications that may be made to the deployment.

Thus, embodiments of the invention may reduce the cognitive burden on a person tasked with managing a deployment thereby improving the usability and/or serviceability of the deployment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An asset mapper for managing a deployment, comprising:
storage for storing a client oriented asset map of the deployment, wherein the deployment comprises a plurality of physical hardware assets; and
a map manager programmed to:
obtain a client oriented location request regarding the deployment from a client, wherein the client comprises a physical positioning sensor;
in response to obtaining the client oriented location request:
obtain location information and an asset map of the deployment, wherein the location information specifies a location of the client relative to at least one of the plurality of physical hardware assets, wherein the location information is determined, at least in part, using the physical positioning sensor;
generate the client oriented asset map of the deployment using the location information and the asset map of the deployment;
modify the client oriented asset map using a data source that describes at least a characteristic of a portion of the deployment to obtain an enhanced client oriented asset map; and
perform an action set using the enhanced client oriented asset map to service the client oriented location request.

2. The asset mapper of claim 1, wherein performing the action set comprises:
generating a client oriented rendering of the deployment based on the enhanced client oriented asset map;
overlaying an indicator of the portion of the deployment on the client oriented rendering; and
overlaying indicators of a path to the portion of the deployment on the client oriented rendering.

3. The asset mapper of claim 2, wherein the client oriented rendering is a top down view of the deployment oriented with respect to the client.

4. The asset mapper of claim 1, wherein performing the action set comprises:
generating a client oriented rendering of the deployment based on the enhanced client oriented asset map; and
overlaying an indicator of the characteristic of the portion of the deployment on the client oriented rendering.

5. The asset mapper of claim 1, wherein performing the action set comprises:

displaying a client oriented rendering of the deployment based on the enhanced client oriented asset map using a remote client;
obtaining overlay update information using the remote client; and
updating the client oriented rendering based on the overlay update information to obtain an updated client oriented rendering.

6. The asset mapper of claim 5, wherein performing the action set further comprises:
displaying the updated client oriented rendering using the client.

7. The asset mapper of claim 6, wherein the remote client is disposed outside of the deployment, wherein the client is disposed proximate to the deployment.

8. A method for managing a deployment, comprising:
obtaining a client oriented location request regarding the deployment from a client,
wherein the deployment comprises a plurality of physical hardware assets and wherein the client comprises a physical positioning sensor;
in response to obtaining the client oriented location request:
obtaining location information and an asset map of the deployment, wherein the location information specifies a location of the client relative to at least one of the plurality of physical hardware assets, wherein the location information is determined, at least in part, using the physical positioning sensor;
generating a client oriented asset map of the deployment using the location information and the asset map of the deployment;
modifying the client oriented asset map using a data source that describes at least a characteristic of a portion of the deployment to obtain an enhanced client oriented asset map; and
performing an action set using the enhanced client oriented asset map to service the client oriented location request.

9. The method of claim 8, wherein performing the action set comprises:
generating a client oriented rendering of the deployment based on the enhanced client oriented asset map;
overlaying an indicator of the portion of the deployment on the client oriented rendering; and
overlaying indicators of a path to the portion of the deployment on the client oriented rendering.

10. The method of claim 9, wherein the client oriented rendering is a top down view of the deployment oriented with respect to the client.

11. The method of claim 8, wherein performing the action set comprises:
generating a client oriented rendering of the deployment based on the enhanced client oriented asset map; and
overlaying an indicator of the characteristic of the portion of the deployment on the client oriented rendering.

12. The method of claim 8, wherein performing the action set comprises:
displaying a client oriented rendering of the deployment based on the enhanced client oriented asset map using a remote client;
obtaining overlay update information using the remote client; and
updating the client oriented rendering based on the overlay update information to obtain an updated client oriented rendering.

13. The method of claim 12, wherein performing the action set further comprises:
displaying the updated client oriented rendering using a local client.

14. The method of claim 13, wherein the remote client is disposed outside of the deployment, wherein the client is disposed proximate to the deployment.

15. A non-transitory computer readable medium comprising computer readable program code, which when executed by a computer processor enables the computer processor to perform a method for managing a deployment, the method comprising:
obtaining a client oriented location request regarding the deployment from a client wherein the deployment comprises a plurality of physical hardware assets and wherein the client comprises a physical positioning sensor;
in response to obtaining the client oriented location request:
obtaining location information and an asset map of the deployment, wherein the location information specifies a location of the client relative to at least one of the plurality of physical hardware assets, wherein the location information is determined, at least in part, using the physical positioning sensor;
obtaining a client oriented asset map of the deployment using the location information and the asset map of the deployment;
modifying the client oriented asset map using a data source that describes at least a characteristic of a portion of the deployment to obtain an enhanced client oriented asset map; and
performing an action set using the enhanced client oriented asset map to service the client oriented location request.

16. The non-transitory computer readable medium of claim 15, wherein performing the action set comprises:
generating a client oriented rendering of the deployment based on the enhanced client oriented asset map;
overlaying an indicator of the portion of the deployment on the client oriented rendering; and
overlaying indicators of a path to the portion of the deployment on the client oriented rendering.

17. The non-transitory computer readable medium of claim 16, wherein the client oriented rendering is a top down view of the deployment oriented with respect to the client.

18. The non-transitory computer readable medium of claim 15, wherein performing the action set comprises:
generating a client oriented rendering of the deployment based on the enhanced client oriented asset map; and
overlaying an indicator of the characteristic of the portion of the deployment on the client oriented rendering.

19. The non-transitory computer readable medium of claim 15, wherein performing the action set comprises:
displaying a client oriented rendering of the deployment based on the enhanced client oriented asset map using a remote client;
obtaining overlay update information using the remote client; and
updating the client oriented rendering based on the overlay update information to obtain an updated client oriented rendering.

20. The non-transitory computer readable medium of claim 19, wherein performing the action set further comprises:

displaying the updated client oriented rendering using a local client.

* * * * *